United States Patent
Lewin

(10) Patent No.: US 11,055,068 B1
(45) Date of Patent: Jul. 6, 2021

(54) PROXYING A TARGET ECMASCRIPT OBJECT REGARDLESS WHETHER THE TARGET ECMASCRIPT OBJECT IS A READ-ONLY OBJECT

(71) Applicant: Microsoft Technology Licensing, LLC, Redmond, WA (US)

(72) Inventor: Guy Lewin, New York City, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/821,975

(22) Filed: Mar. 17, 2020

(51) Int. Cl.
  *G06F 9/44* (2018.01)
  *G06F 8/30* (2018.01)
  *H04L 29/08* (2006.01)

(52) U.S. Cl.
  CPC ............... *G06F 8/30* (2013.01); *H04L 67/28* (2013.01)

(58) Field of Classification Search
  None
  See application file for complete search history.

(56) References Cited

U.S. PATENT DOCUMENTS

| 7,516,447 B2 * | 4/2009 | Marvin | G06F 9/465 717/108 |
| 8,484,664 B2 * | 7/2013 | Marvin | G06F 9/465 719/320 |
| 10,860,351 B1 * | 12/2020 | Lewin | G06F 21/54 |
| 2005/0081216 A1 * | 4/2005 | Taylor | G06F 9/548 719/315 |

OTHER PUBLICATIONS

"Application as Filed in U.S. Appl. No. 16/717,757", filed Dec. 17, 2019, 67 Pages.
"Proxy", https://web.archive.org/web/20191031083617/https://developer.mozilla.org/en-US/docs/Web/JavaScript/Reference/Global_Objects/Proxy, Oct. 31, 2019, 20 Pages.

* cited by examiner

*Primary Examiner* — Anna C Deng
(74) *Attorney, Agent, or Firm* — Wade IP Law PLLC

(57) ABSTRACT

Techniques are described herein that are capable of proxying a target ECMAScript object regardless whether the target ECMAScript object is a read-only object. For instance, when a determination is made that a requested target ECMAScript object includes at least one read-only property, the requested target ECMAScript object is proxied by performing operations, which include creating a new target ECMAScript object to replace the requested target ECMAScript object and associating handler objects, which are configured to perform respective operations on a property of the requested target ECMAScript object, with the new target ECMAScript object to generate a proxied target ECMAScript object.

23 Claims, 15 Drawing Sheets

— 200

```
MICROSOFT_PROXY = new Proxy(window || self, {
    //Retrieve a property from target
    get: function (target, prop) {
        return target[prop];
    }
    set: function (target, prop, newValue) {
        target[prop] = newValue;
    }
    apply: function (target, thisArg, argArray) {
    }
});
```

```
//Define a new object "a"
a = {}
{}
//Define a property inside "a"; the property is called "bla", and the attributes are
"configurable: false" and "value: 42"
Object.defineProperty(a, "bla", {configurable: false, value: 42})
{bla: 42}
//By typing "a.bla", we get "42"
a.bla
42
//Create a new proxy that proxies "a" and handles "get", so that every "get" will call this
function
b = new Proxy(a, {get: function(target, p, receiver) {
        return 43;
}})
Proxy {bla: 42}
//Typing "b.bla" provides an error
b.bla
Uncaught TypeError: 'get' on proxy: property 'bla' is a read-only and non-configurable data
property on the proxy target but the proxy did not return its actual value (expected '42' but
got '43') at <anonymous>:1:3
```

FIG. 3

```
//In hook.js
HANDLERS = {
        //Retrieve a property from target global object (i.e., window) in this example
        get: function (target, prop, receiver) {
                realValue = target [prop];
                if (hasReadOnlyProperties(realValue)) {
                        //DO SOMETHING
                } else {
                        new Proxy(realValue, HANDLERS);
                }
        }
}
MICROSOFT_PROXY = new Proxy(globalObject, HANDLERS);
```

```
//In hook.js
//Implement all of the handlers
function getHackHandlers(realValue) {
        get: function(target, prop, receiver); {
                return realValue[prop];
        }
        set: function(target, prop, newValue); {
                realValue[prop] = newValue;
        }
        construct ...
        defineProperty ...
        deleteProperty ...
        enumerate ...
        getOwnPropertyDescriptor ...
        getPrototypeOf ...
        has ...
        isExtensible ...
        wonKeys ...
        preventExtensions ...
        setPrototypeOf ...
}
//Implement only selected handlers
HANDLERS = {
        //Retrieve a property from target ("globalObject" in this example)
        get: function (target, prop, receiver) {
                realValue = target [prop];
                if (hasReadOnlyProperties(realValue)) {
                        //Initiate proxying by creating an empty object
                        return new Proxy({}, getHackHandlers(realValue))
                } else {
                        //This is the recursive aspect
                        return new Proxy(realValue, HANDLERS);
                }
        }
        apply ...
        set ...
        construct ...
}
MICROSOFT_PROXY = new Proxy(globalObject, HANDLERS);
```

FIG. 7

```
function a() {console.log("hi");}
a()
hi b = new Proxy(a, {})
Proxy (length: 0, name: "a", arguments: null, caller: null, prototype: {_}} b()
hi typeOf a
"function"

typeOf b
"function"

c = new Proxy(Object.create(null), {
        apply: function(target, t, args) {
                //Call "a" with no arguments, and pass the "t" argument
                a.apply(t, args)
        }
})
Proxy {}
```

```
HANDLERS = {
    //Retrieve a property from target global object ("window" in this example)
    get: function (target, prop, receiver) {
        realValue = target [prop];
        if (hasReadOnlyProperties(realValue)) {
            if (typeOf realValue === "function") {
                return new Proxy(function () {}, getHackHandlers(realValue))
            } else {
                return new Proxy(Object.create(null),
                    getHackHandlers(realValue))
            }
        } else {
            return new Proxy(realValue, HANDLERS);
        }
    }
    apply ...
    set ...
    construct ...
}
```

FIG. 9

```
HANDLERS = {
    //Retrieve a property from target global object ("window" in this example)
    get: function (target, prop, receiver) {
        realValue = target [prop];
        if (hasReadOnlyProperties(realValue)) {
            if (typeOf realValue === "function") {
                var dummyFunc = function () {};
                dummyFunc.prototype = new
                Proxy(dummyFunc.prototype, HANDLERS);
                dummyFunc.constructor = new
                Proxy(dummyFunc.constructor, HANDLERS);
                //DO THE SAME FOR ALL PROPERTIES
                ...
                return new Proxy(dummyFunc,
                getHackHandlers(realValue))
            } else {
                return new Proxy(Object.create(null),
                getHackHandlers(realValue))
            }
        } else {
            return new Proxy(realValue, HANDLERS);
        }
    }
    apply ...
    set ...
    construct ...
}
```

FIG. 10

PROXYING A TARGET ECMASCRIPT OBJECT REGARDLESS WHETHER THE TARGET ECMASCRIPT OBJECT IS A READ-ONLY OBJECT

BACKGROUND

A proxy server is a computing device that serves as an intermediary between a client device (e.g., a browser thereon) and a web server to intercept requests initiated by the client device that request resources from the web server. The proxy server typically analyzes and/or modifies a resource before passing on the requested or modified resource to the client device.

One example of a resource is a web page. A web page includes multiple elements. One example of an element that may be included in a web page is an ECMAScript object. An ECMAScript object is an object that conforms to the ECMAScript standard, which is a scripting-language specification developed and maintained by Ecma International in ECMA-262 and ISO/IEC 16262. Example implementations of ECMAScript include but are not limited to JavaScript®, Jscript®, and ActionScript®.

Although the sixth edition of ECMAScript (a.k.a. ES6) introduced proxy objects as a way to modify actions performed on ECMAScript objects, ES6 and subsequent versions of ECMAScript impose limitations on the use of proxy objects to maintain security and browser performance. For example, a property of an ECMAScript object that is non-configurable (i.e., configurable=false) cannot be changed by proxy wrapping the ECMAScript object. In another example, native browser methods (a.k.a. functions), such as document.addEventListener, cannot accept proxy objects as arguments or as "this" context. Accordingly, proxy objects traditionally are not useful for hooking browser actions.

SUMMARY

Various approaches are described herein for, among other things, proxying a target ECMAScript object regardless whether the target ECMAScript object is a read-only object. A read-only object is an object that has at least one read-only property. A read-only property is a property that is not capable of being redefined. For example, a property having an attribute of "configurable=false" in JavaScript® constitutes a read-only property. Redefining a property changes a definition of the property and/or a value of the property. For instance, if a read-only object having a read-only property is proxied, a "get" hook in the resulting proxy object must return the same type and value for the property that the read-only object returns. It will be recognized that attempting to redefine a read-only property of a read-only object causes an error to occur with regard to (e.g., during) proxying of the read-only object. For example, such an error may cause an exception to be thrown. One example type of a read-only object is a function object. A function object is an object that defines a function.

In a first example approach, a request for a target ECMAScript object is received from an ECMAScript engine. The target ECMAScript object includes multiple properties. Handler object(s), which are configured to perform respective operation(s) on a property of the target ECMAScript object, are defined. A determination is made whether the target ECMAScript object includes at least one read-only property. Each property of the target ECMAScript object is read-only if the property is not capable of being redefined. Each property of the target ECMAScript object is not read-only if the property is capable of being redefined. A proxying technique is selected from multiple proxying techniques to use to proxy the target ECMAScript object based at least in part on whether the target ECMAScript object includes at least one read-only property. The proxying techniques include a first proxying technique and a second proxying technique. The target ECMAScript object is proxied using the selected proxying technique to generate a proxied target ECMAScript object in response to the request that requests the target ECMAScript object. Proxying the target ECMAScript object includes a first operation or a second operation. The first operation includes creating a new target ECMAScript object to replace the target ECMAScript object and associating at least the handler object(s) with the new target ECMAScript object to generate the proxied target ECMAScript object using the first proxying technique based at least in part on the target ECMAScript object including at least one read-only property. The second operation includes applying the handler object(s) to the target ECMAScript object to generate the proxied target ECMAScript object using the second proxying technique based at least in part on the target ECMAScript object not including at least one read-only property.

In a second example approach, a determination is made that a requested target ECMAScript object includes at least one read-only property. Each property of the requested target ECMAScript object is read-only if the property is not capable of being redefined. Each property of the requested target ECMAScript object is not read-only if the property is capable of being redefined. The requested target ECMAScript object is proxied to generate a proxied target ECMAScript object based at least in part on determining that the requested target ECMAScript object includes at least one read-only property by performing operations. The operations comprise creating a new target ECMAScript object to replace the requested target ECMAScript object. The operations further comprise associating a plurality of handler objects, which are configured to perform a plurality of respective operations on a property of the requested target ECMAScript object, with the new target ECMAScript object to generate the proxied target ECMAScript object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 3 shows example code that attempts to re-define a read-only property of a read-only object in accordance with an embodiment.

FIG. 7 shows example code that initiates proxying of a target ECMAScript object by creating an empty object in accordance with an embodiment.

FIG. 9 shows example code that initiates proxying of a function object by creating an empty function object in accordance with an embodiment.

FIG. 10 shows example code that initiates proxying of a function object by creating an empty function object and proxying default properties of the empty function object in accordance with an embodiment.

Figure 1A:
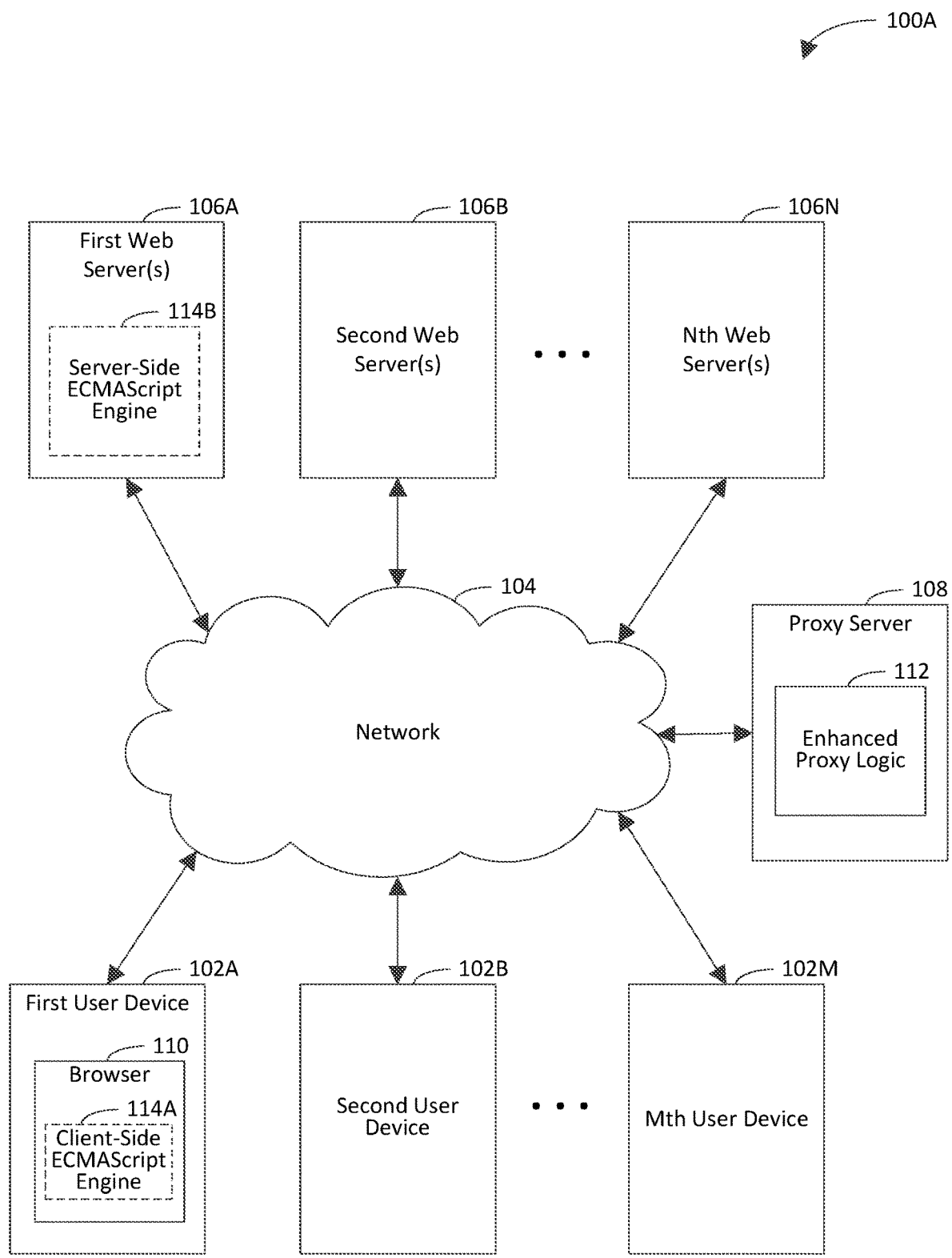
FIG. 1A is a block diagram of an example enhanced proxy system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of proxying a target ECMAScript object regardless whether the target ECMAScript object is a read-only object. A read-only object is an object that has at least one read-only property. A read-only property is a property that is not capable of being redefined. For example, a property having an attribute of "configurable=false" in JavaScript® constitutes a read-only property. Redefining a property changes a definition of the property and/or a value of the property. For instance, if a read-only object having a read-only property is proxied, a "get" hook in the resulting proxy object must return the same type and value for the property that the read-only object returns. It will be recognized that attempting to redefine a read-only property of a read-only object causes an error to occur with regard to (e.g., during) proxying of the read-only object. For example, such an error may cause an exception to be thrown. One example type of a read-only object is a function object. A function object is an object that defines a function Example techniques described herein have a variety of benefits as compared to conventional techniques for proxying objects of a resource. For instance, the example techniques may be capable of proxying read-only objects of the resource. The example techniques may be capable of proxying any object or method of the resource according to ES6 and subsequent versions of ECMAScript, regardless of property definitions and structure of the object or method that is to be proxied. Accordingly, the example techniques may enable using proxy objects on all objects in an ECMAScript engine (e.g., all objects in a browser that includes the ECMAScript engine). The example techniques may enable hooking of ECMAScript objects with relative ease and controlling corresponding plugin actions. The example techniques may enable recursive proxying of an entire global object.

The example techniques may increase security of a resource by wrapping the objects of the resource. The example techniques may reduce an amount of time and/or resources (e.g., processor, memory, network bandwidth) that are consumed to monitor and/or control a resource. For instance, by proxying read-only objects of the resource, additional steps that traditionally are performed in an effort to provide control and security with regard to such objects need not necessarily be performed. The example techniques may increase efficiency of a proxy server that is used to proxy objects of a resource. For instance, the example techniques may recursively proxy (e.g., automatically recursively proxy) properties of a target ECMAScript object, which may increase efficiency of the proxy server. The example techniques may increase user efficiency (e.g., by reducing a number of steps and/or an amount of time that a user (e.g., IT administrator) takes in an attempt to provide control and security with regard to proxy objects. For instance, recursively proxying objects of a resource may reduce (e.g., eliminate) a need for the user to manually perform operations in an attempt to provide control and security with regard to the objects.

FIG. 1A is a block diagram of an example enhanced proxy system 100A in accordance with an embodiment. Generally speaking, the enhanced proxy system 100A operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, the enhanced proxy system 100A proxies a target ECMAScript object regardless whether the target ECMAScript object is a read-only object.

As shown in FIG. 1A, the enhanced proxy system 100A includes a plurality of user devices 102A-102M, a network 104, a plurality of web servers 106A-106N, and a proxy server 108. Communication among the user devices 102A-102M, the web servers 106A-106N, and the proxy server 108 is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with the web servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the web servers 106A-106N for requesting information stored on (or otherwise accessible via) the web servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., websites) hosted by the web servers 106A-106N, so that the user devices 102A-102M may access information that is available via the domains. Such domains may include web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user devices 102A-102M may communicate with any one or more web servers 106A-106N.

The first user device 102A includes a browser 110. The browser 110 is a software application that is configured to enable a user of user device 102A to access resources on the World Wide Web (WWW). For instance, when the user provides a request for a resource, the browser retrieves the resource from one or more of the web servers 106A-106N and provides the resource for display to the user on the user device 102A. For example, the request for the resource may include a uniform resource identifier (URI) that corresponds to a location (e.g., memory location on a web server) at which the resource is hosted. The URI may be a uniform resource locator (URL) or a uniform resource name (URN). Upon receiving the request, the browser 110 may retrieve the resource from a web server that hosts the resource based on the URI. It will be recognized that the resource may be a resources of a webpage (e.g., hypertext markup language (HTML) document).

The browser 110 includes a client-side ECMAScript engine 114A. The client-side ECMAScript engine 114A is a computer program that executes ECMAScript code. For instance, the client-side ECMAScript engine 114A may interpret the ECMAScript code and perform just-in-time compilation of the code. The browser 110 may include other engines, such as a rendering engine. For example, the ECMAScript engine 114A may run in combination with a rendering engine via the Document Object Model (DOM) so that retrieved resources may be transformed into an interactive visual representation on the first user device 102A.

The browser 110 is shown to be incorporated in the first user device 102A for illustrative purposes and is not intended to be limiting. It will be recognized that the browser 110 may be incorporated in any of the user devices 102A-102M. For instance, each of the user devices 102A-102M may include a respective browser.

The web servers 106A-106N are processing systems that are capable of communicating with the user systems 102A-102M. The web servers 106A-106N are configured to execute computer programs that provide resources to users in response to receiving requests from the users. For example, the resources may include documents (e.g., web pages, images, audio files, video files, etc.), output of executables, or any other suitable type of resources. In accordance with some example embodiments, the web servers 106A-106N are configured to host respective web sites, so that the web sites are accessible to users of the enhanced proxy system 100A.

The first web server(s) 106A include a server-side ECMAScript engine 114B. The server-side ECMAScript engine 114B is a computer program that executes ECMAScript code.

The proxy server 108 is a processing system that serves as an intermediary between the client devices 102A-102M and the web servers 106A-106N to intercept requests initiated by the client devices 102A-102M that request resources from the web servers 106A-106N. The proxy server 108 includes enhanced proxy logic 112, which is capable of analyzing and/or modifying the requested resources before passing on the requested or modified resources to the client device 102A-102M. For instance, the enhanced proxy logic 112 is configured to proxy objects in the requested resources regardless whether the objects are read-only objects.

In an example implementation, the enhanced proxy logic 112 receives a request for a target ECMAScript object from the client-side ECMAScript engine 114A or the server-side ECMAScript engine 114B. The target ECMAScript object includes multiple properties. The enhanced proxy logic 112 defines handler object(s), which are configured to perform respective operation(s) on a property of the target ECMAScript object. The enhanced proxy logic 112 determines whether the target ECMAScript object includes at least one read-only property. Each property of the target ECMAScript object is read-only if the property is not capable of being redefined. Each property of the target ECMAScript object is not read-only if the property is capable of being redefined. The enhanced proxy logic 112 selects a proxying technique from multiple proxying techniques to use to proxy the target ECMAScript object based at least in part on whether the target ECMAScript object includes at least one read-only property. The proxying techniques include a first proxying technique and a second proxying technique. The enhanced proxy logic 112 selects the first proxying technique if the target ECMAScript object includes at least one read-only property. The enhanced proxy logic 112 selects the second proxying technique if the target ECMAScript object does not include at least one read-only property. The enhanced proxy logic 112 proxies the target ECMAScript object using the selected proxying technique to generate a proxied target ECMAScript object in response to the request that requests the target ECMAScript object. More particularly, if the target ECMAScript object includes at least one read-only property, the enhanced proxy logic 112 proxies the target ECMAScript object using the first proxying technique by (a) creating a new target ECMAScript object to replace the target ECMAScript object and (b) associating at least the handler object(s) with the new target ECMAScript object to generate the proxied target ECMAScript object. If the target ECMAScript object does not include at least one read-only property, the enhanced proxy logic 112 proxies the target ECMAScript object using the second proxying technique by applying the handler object(s) to the target ECMAScript object to generate the proxied target ECMAScript object.

The enhanced proxy logic 110 may be implemented in various ways to proxy a target ECMAScript object regardless whether the target ECMAScript object is a read-only object, including being implemented in hardware, software, firmware, or any combination thereof. For example, the enhanced proxy logic 110 may be implemented as computer program code configured to be executed in one or more processors. In another example, the enhanced proxy logic 110 may be at least partially implemented as hardware logic/electrical circuitry. For instance, the enhanced proxy logic 110 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

The proxy server 108 may be coupled to the user devices 102A-102M, the network 104, and/or the web servers 106A-106N in any suitable arrangement. For instance, the proxy server 108 may be configured as a forward proxy server or a reverse proxy server. Further detail regarding forward proxy servers and reverse proxy servers is provided below with reference to FIGS. 1B and 1C.

Figure 1B:
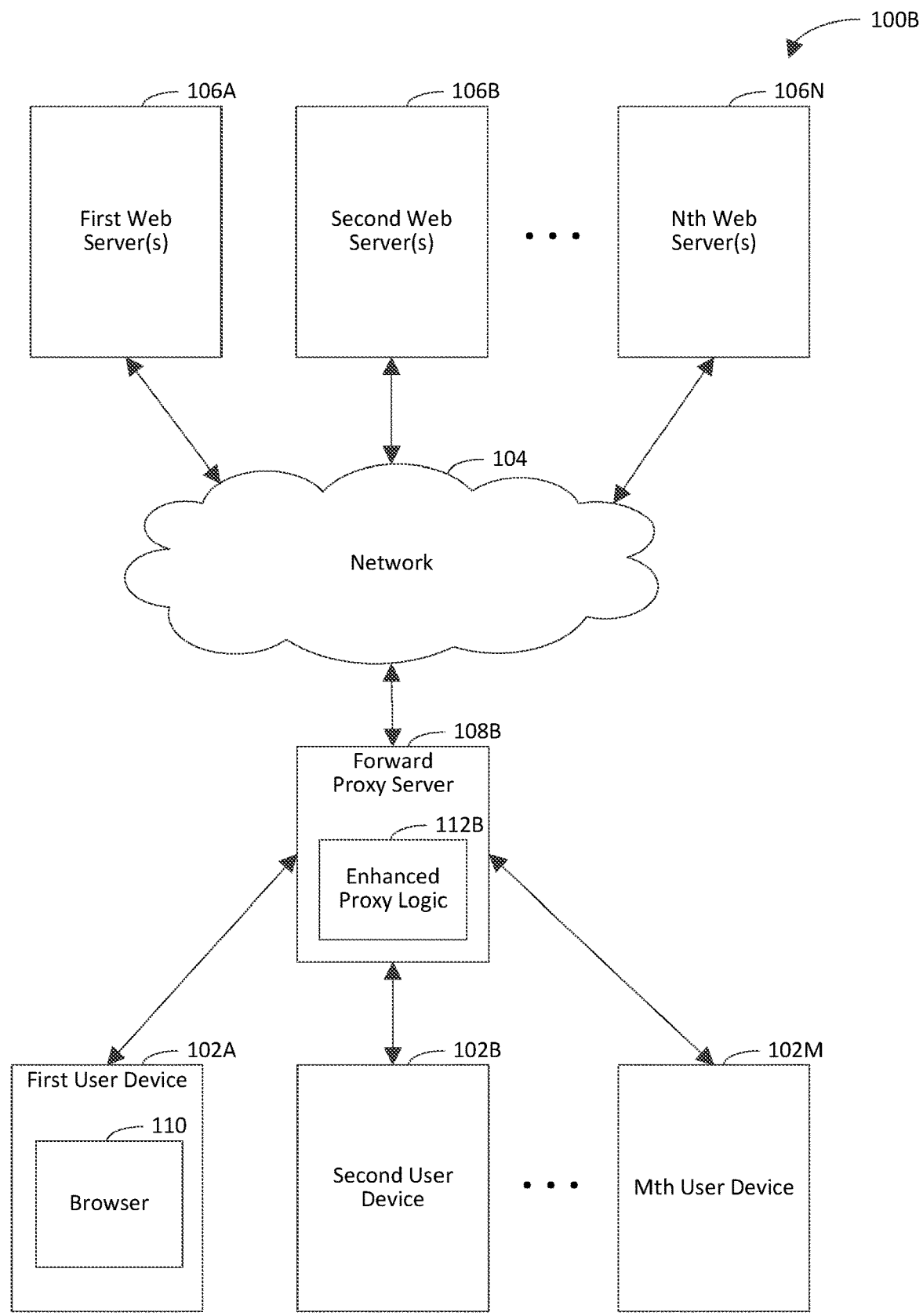
FIG. 1B is a block diagram of an example implementation of the enhanced proxy system shown in FIG. 1A, including a forward proxy server, in accordance with an embodiment.

FIG. 1B is a block diagram of an example enhanced proxy system 100B that includes a forward proxy server 108B in accordance with an embodiment. The enhanced proxy system 100B is an example implementation of the enhanced proxy system 100A shown in FIG. 1A. As shown in FIG. 1B, the enhanced proxy system 100B includes the user devices 102A-102M, the network 104, and the web servers 106A-106N, all of which are operable in the manner described above with respect to FIG. 1A. FIG. 1B differs from FIG. 1A in that the proxy server 108 of FIG. 1A is shown to be implemented as a forward proxy server 108B in FIG. 1B. In the following discussion, an arbitrary user device (e.g., any one of user devices 102A-102M) will be referred to as "user device 102," and an arbitrary web server (e.g., any one of web servers 106A-106N) will be referred to as "web server 106."

The forward proxy server 108B is coupled between the network 104 and the user devices 102A-102M. The forward proxy server 108B generally may act on behalf of a user device 102 to communicate with one or more of the web servers 106A-106N. When the user device 102 is to access a web server 106, the user device 102 may send a request through the forward proxy server 108B (e.g., enhanced proxy logic 112B therein) toward the network 104. A user of the user device 102 may configure the forward proxy server 108B to be coupled between the user device 102 and the network 104. For example, the user may manually input an internet protocol (IP) address of the forward proxy server 108B to force the browser 110 to send each resource request through the forward proxy server 108B. In another example, an organization's IT administrator may configure the forward proxy server 108B within the organization's local network to force all requests initiated through the organization's local network to be sent through the forward proxy server 108B.

The user device 102 (e.g., the browser 110 or ECMAScript engine therein) may request access to a web page hosted at the web server 106. In the embodiment of FIG. 1B, the request is not sent directly to the web server 106. Rather, the request is sent to the forward proxy server 108B, and the forward proxy server 108B forwards the request to the web server 106. After the web server 106 receives the request from the forward proxy server 108B, the web server 106 sends the requested web page to the forward proxy server 108B. Once the forward proxy server 108B receives the requested web page, the forward proxy server 108B (e.g., enhanced proxy logic 112B therein) may determine whether the web page is to be forwarded to the user device 102.

For example, if the forward proxy server 108B is managed by an IT administrator in a work environment of an employer, the employer may set up the forward proxy server 108B to block users from visiting specified sites, e.g., social networks, explicit sites, etc. In another example, the forward proxy server 108B may be used by the IT administrator to monitor activities of users, e.g., employees' activities at work. For instance, the forward proxy server 108B may log the employee's activities and detect potential anomalies. In yet another example, the forward proxy server 108B may be used to unblock a site that is blocked or banned by an internet service provider (ISP) or government. For instance, a government may prohibit users from accessing certain domains, but the users may use the forward proxy server 108B to unblock the domains that are blocked by the government. In still another example, users may use the forward proxy server 108B to mask their IP addresses to enable the users to access one or more of the web servers 106A-106N.

Figure 1C:
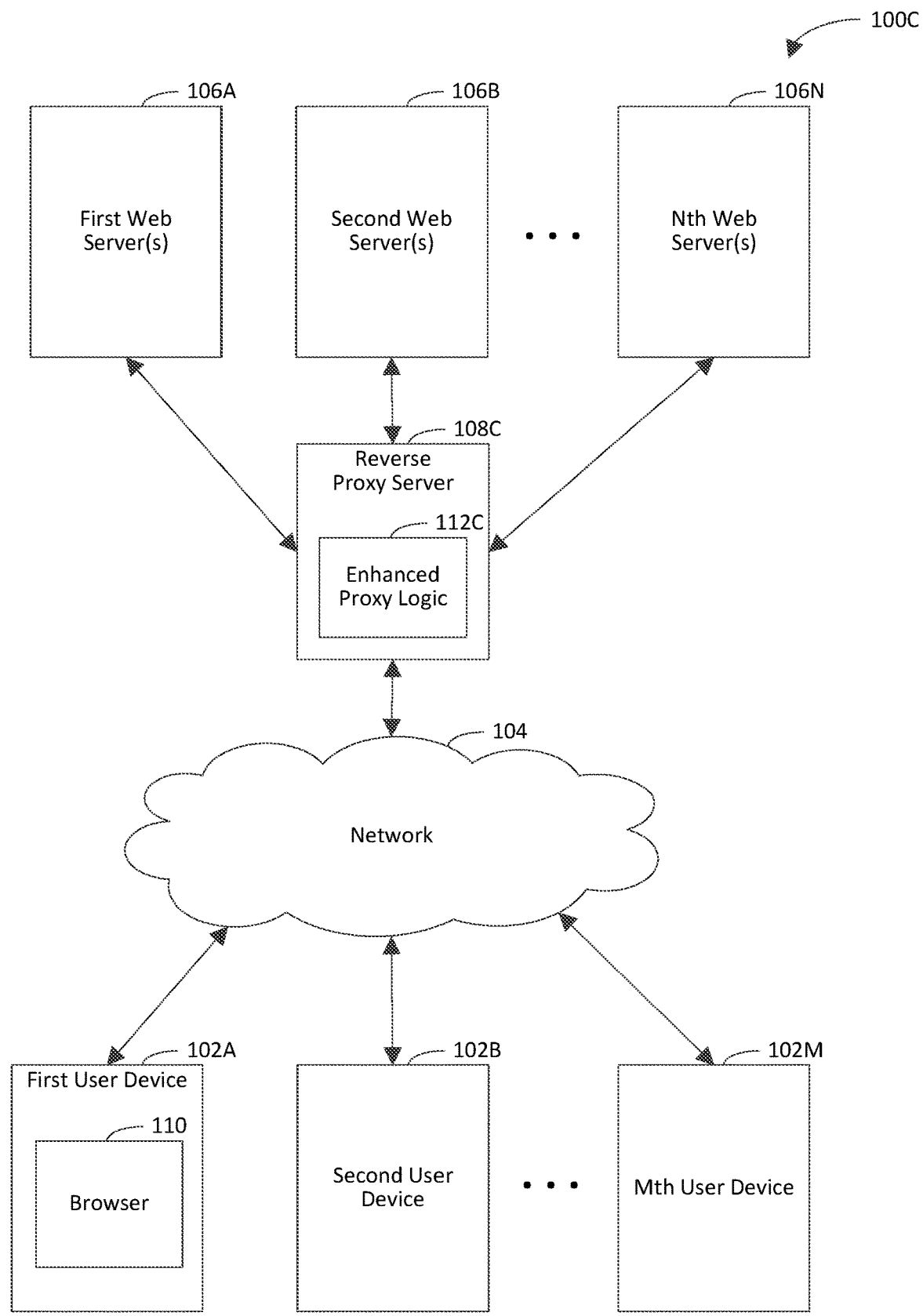
FIG. 1C is a block diagram of another example implementation of the enhanced proxy system shown in FIG. 1A, including a reverse proxy server, in accordance with an embodiment.

FIG. 1C is a block diagram of an example enhanced proxy system 100C that includes a reverse proxy server 108C in accordance with an embodiment. The enhanced proxy system 100C is another example implementation of the enhanced proxy system 100A shown in FIG. 1A. As shown in FIG. 1C, the enhanced proxy system 100C includes the user devices 102A-102M, the network 104, and the web servers 106A-106N, all of which are operable in the manner described above with respect to FIG. 1A. FIG. 1C differs from FIG. 1A in that the proxy server 108 of FIG. 1A is shown to be implemented as a reverse proxy server 108C in FIG. 1C.

The reverse proxy server 108C is coupled between the network 104 and the web servers 106A-106N. The reverse proxy server 108C generally may act on behalf of a web server to communicate with one or more of the user devices 102A-102M. Accordingly, the reverse proxy server 108C may serve as a proxy to a particular web server 106. When each of the clients 102A-102M requests to access the web server 106, the request may be sent to the reverse proxy server 108C (e.g., enhanced proxy logic 112C therein), and the reverse proxy server 108C may forward the request to the web server 106.

In an example embodiment, the reverse proxy server 108C need not necessarily forward the request to the web server 106. For instance, the reverse proxy server 108C may act as a security guard that monitors the IP addresses of the user devices from which the requests are received and blocks IP addresses that are listed on a blacklist. The reverse proxy server 108C may be used to achieve various additional functions, including but are not limited to scrubbing traffic, masking the IP address of the web server 106, and improving site speed through a content delivery network (CDN). For example, the CDN may have configured a variety of redundant servers. The reverse proxy server 108C may be configured to forward requests for accessing resources to a redundant server that is the closest to the user device 102. The reverse proxy server 108C may be used to reduce a risk of exposing the web server 106 to intruders. The reverse proxy server 108C may serve as a cache server that caches frequently visited web pages. When a request for a frequently visited web page is received from a user device 102, the reverse proxy server 108C may send a cached web page to the user device 102 without having to access the web server 106. When a cashed web page is sent to the user device 102, the reverse proxy server 108C may update the original URL of the web page to the URL of the cached content.

In another example embodiment, the name of the reverse proxy server 108C may be added to the end of the original URL as a suffix. For instance, the original URL of the web page that is requested by the user device 102 may be "abc.com", the URL of the reverse proxy server 108C may be "xyz.com", and the reverse proxy server 108C may cache the web page at a location corresponding to a URL that looks like "abc.com.xyz.com", which adds the name of the reverse proxy server 108C to the end of the original URL. Such a proxy server that returns a URL that adds its own name to the end of the original URL may also be called a "suffix proxy."

In addition to caching the frequently visited web pages, some suffix proxies are capable of modifying a web page and storing the modified web page at a location that corresponds to a suffixed URL. When the browser 110 requests to access the web page, the suffix proxy may redirect the browser 110 to the suffixed URL. In such a case, the browser is caused to access the modified web page, which may appear to be the same as the original web page, but the modified web page may perform different operations or functions or behave differently than the original web page.

Each of the proxy servers 108, 108B, and 108C shown in respective FIGS. 1A-1C may be configured as a reverse suffix proxy server. When a reverse suffix proxy server receives a request for a resource, which includes a URL indicating a location of the resource, the reverse suffix proxy server appends a suffix to the URL, which directs the user to a version of the resource that is protected with policies. For instance, if the user requests to access dropbox.com, the reverse suffix proxy server may append microsoft.com to the URL, resulting in dropbox.com.microsoft.com, enabling the user to access a version of dropbox.com that is protected with policies provided by Microsoft Corporation. By using a reverse suffix proxy server, an organization may control which resources users are allowed to access, control which actions the users are allowed to perform with regard to those resources, and/or monitor the actions that are performed by the users.

The URLs generated by the reverse suffix proxy server are not the original URLs of the applications that the users request to access, and some scripting languages, such as JavaScript®, rely on the URLs. The URLs may be built on the client side (i.e., in the browser), though the example embodiments are not limited in this respect. Accordingly, the reverse suffix proxy server may wrap scripts in a wrapper before providing the scripts to the users. For instance, the reverse suffix proxy server may insert a line of code before and after each script code snippet embedded in a web page. The inserted code, which may be referred to as a "browser hook," is configured to cause the browser from which the request is received to perform a recursive process to replace certain script objects by proxy objects. Although such script objects may have read-only properties, the example embodiments described herein enable the script objects to be proxied. More particularly, the example embodiments may enable proxying of any read-only object. FIGS. 2-10 show example code, which is discussed below to illustrate some of the techniques that may be employed to enable proxying of such read-only objects.

Figure 2:
FIG. 2 shows example code to proxy a target ECMAScript object in accordance with an embodiment.

FIG. 2 shows example code 200 to proxy a target ECMAScript object in accordance with an embodiment. As shown in FIG. 2, MICROSOFT_PROXY is a proxy object that wraps the target ECMAScript object. The target ECMAScript object is the global object "window||self," which means window or self. MICROSOFT_PROXY inserts hooks by defining function objects to replace (e.g., override) get, set, and apply operations on the target ECMAScript object. The get operation retrieves a property from the target ECMAScript object. The set operation sets a property in the target ECMAScript object to be newValue. The apply operation is applicable if the target ECMAScript object is a function object. The apply operation calls the function object with argArray, and thisArg is "this" object transferred into a function object. If an attempt is made to access a read-only property (e.g., window.document) of the target ECMAScript object, the attempt will be successful because although the get operation has been replaced, the real read-only property will be returned. No changes are made to the value of the property before the value is returned to the calling statement.

FIG. 3 shows example code 300 that attempts to re-define a read-only property of a read-only object in accordance with an embodiment. As shown in FIG. 3, a new object "a" is defined. A property "bla" is defined inside the new object. The property has the attributes "configurable: false" and "value: 42". After defining the property, if "a.bla" is written, the value 42 is returned. A new proxy "b" is defined to proxy "a" and handle "get" so that the listed function object is called each time a get operation is performed. When "b" is defined, "Proxy (bla: 42)" is shown. Now, typing "b.bla" results in an error because bla is a read-only property of function object "a", and the proxy "b" returned 43, which is different from the expected value of 42. For instance, the value of a.bla may be compared to the value of b.bla to determine that the values are not the same. Recall that because bla is a read-only property of the function object "a", the value of 42 cannot be redefined. Accordingly, the value of bla cannot be changed from 42 to 43.

Figure 4:
FIG. 4 shows example code that defines a function object to recursively wrap objects of a document in accordance with an embodiment.

FIG. 4 shows example code 400 that defines a function object to recursively wrap objects of a document in accordance with an embodiment. As shown in FIG. 4, MICROSOFT_PROXY is a proxy object that wraps the target ECMAScript object. MICROSOFT_PROXY defines a function object to replace a get operation on the target ECMAScript object. The function object is defined to use the same handlers on properties of the target ECMAScript object that were used on the target ECMAScript object itself. By using the same handlers on the properties of the target ECMAScript object, recursive proxying of properties (e.g., objects that define the properties) is performed. However, it should be noted that proxying properties of the target ECMAScript object as shown in FIG. 4 will result in an error for each property that is read-only because the function object that replaces the get operation returns a value that is different from a value that is expected for the property.

Figure 5:
FIGS. 5 and 6 show example code that treats read-only objects differently from other objects in accordance with embodiments.
Figure 6:

FIGS. 5 and 6 show example code 500 and 600 that treats read-only objects differently from other objects in accordance with embodiments. As shown in FIG. 5, the code 500 is configured to "DO SOMETHING" if the target ECMAScript object has at least one read-only property. Otherwise, the handlers are applied to the target ECMAScript object and the properties of the target ECMAScript object are recursively proxied. In FIG. 5, the get handler is defined within a function object named "getHandlers". FIG. 6 shows that the get handler need not necessarily be defined within a function object. For instance, the get handler in the code 600 of FIG. 6 is shown to be defined within an object named "HANDLERS", which is not a function object. Although the code 500 and 600 of FIGS. 5 and 6 is shown to define a single handler (i.e., the "get" handler), it will be recognized that the code 500 and 600 may define any suitable handlers (e.g., get, set, apply, construct, and so on).

FIG. 7 shows example code 700 that initiates proxying of a target ECMAScript object by creating an empty object in accordance with an embodiment. As shown in FIG. 7, the code 700 includes a function object "getHackHandlers", an object "HANDLERS", and a proxy object "MICROSOFT_PROXY". The function object "getHackHandlers" is defined to implement all the operations that are capable of being performed on a property (e.g., because it is not known which properties are going to be accessed from the proxy object that is returned). For instance, the function object "getHackHandlers" includes function objects that replace the get, set, construct, defineProperty, deleteProperty, enumerate, getOwnPropertyDescriptor, getPrototypeOf, has, isExtensible, ownKeys, preventExtensions, and setPrototypeOf handlers. A function object that replaces a handler is also referred to herein as a handler function object.

The object "HANDLERS" is defined to implement selected (e.g., fewer than all) operations that are capable of being performed on a property (e.g., to provide faster and/or more efficient proxying than would occur by implementing all the operations that are capable of being performed). For instance, the object "HANDLERS" is shown to implement the get, apply, set, and construct handlers and to not implement the other handlers that are implemented in the function object "getHackHandlers". In the object "HANDLERS", if the target ECMAScript object includes at least one read-only property, proxying of the target ECMAScript object is initiated by creating an empty object and applying the handler function objects that are included in the function object "getHackHandlers" to the target ECMAScript object. If the target ECMAScript object does not include at least one read-only property, the target ECMAScript object is proxied using the handler function objects defined in the object "HANDLERS". This will result in recursive proxying of the properties of the target ECMAScript object.

The proxy object "MICROSOFT_PROXY" proxies the target ECMAScript object, which is identified as a globalObject, using the handler function objects defined in the object "HANDLERS". As indicated by the object "HANDLERS", properties of the target ECMAScript object are recursively proxied using the same handlers that are used to proxy the target ECMAScript object. However, it should be noted that the empty object that is created as shown in the code 700 actually includes some properties, which are created by default. Moreover, at least one of the properties (e.g., prototype) is a read-only property. Thus, rather than initiating proxying of the target ECMAScript object by creating an empty object as shown in FIG. 7, proxying may be initiated by creating an object that includes no read-only properties. For instance, the proxying may be initiated by creating an object that includes no properties at all. For example, in JavaScript®, object.create(null) may be used to create an object that has no properties. The empty object shown in FIG. 7 is created with the object prototype because the object is constructed by an object; whereas, an object that includes no properties may be created using object.create, which is a function that enables creation of an object from a prototype. Thus, by giving the object the "null" prototype, the object will be created without a prototype. An implementation of object.create(null) is shown in FIG. 10.

It should be further noted that even though functions are objects, a proxy of a function requires a function target. For instance, even if the proxy of the function has all the properties of an object, a target of the proxy cannot be an empty object. If the target of the proxy of the function is an empty object, the function cannot be called.

Figure 8:
FIG. 8 shows example code that attempts to proxy an empty function object (i.e., a function object having an empty target ECMAScript object) in accordance with an embodiment.

FIG. 8 shows example code 800 that attempts to proxy an empty function object (i.e., a function object having an empty target ECMAScript object) in accordance with an embodiment. As shown in FIG. 8, a function object "a" is defined to cause the word "hi" to be printed on the console. Accordingly, when the function object "a" is called, we see that the word "hi" is printed on the console. If a proxy "b" of the function object "a" is defined using no handlers, the target of the proxy is indicated to have a length of zero, to have the name "a", to have no arguments and no caller, and to have a blank prototype. When the proxy "b" is called, we see that the word "hi" is printed on the console. By typing "typeOf a", we see that the type of "a" is "function". By typing "typeOf b", we see that the type of "b" also is a "function". A proxy "c" is then initiated using a target ECMAScript object that has no properties, and the function object "a" is called with no arguments, resulting in Proxy { }. Note that the object having no properties is created using Object.create(null). When the proxy "c" is called, an error occurs because the type of "c" is "object", but the expected type of "c" is "function". For instance, if we were to type "typeOf c", the result would be "object". The target "typeOf" cannot be proxied. In an effort to address this issue, an empty function object, rather than an object having no properties, may be passed.

FIG. 9 shows example code 900 that initiates proxying of a function object by creating an empty function object in accordance with an embodiment. As shown in FIG. 9, if the target ECMAScript object includes at least one read-only property, a determination is made whether the type of the target ECMAScript object is a function. If the type of the target ECMAScript object is a function, proxying of the target ECMAScript object is initiated by creating an empty function object and applying the handler function objects that are included in the function object "getHackHandlers" to the target ECMAScript object. If the target ECMAScript object includes at least one read-only property but the type of the target ECMAScript object is not a function, proxying of the target ECMAScript object is initiated by creating an object that has no properties using Object.create(null) and applying the handler function objects that are included in the function object "getHackHandlers" to the target ECMAScript object. If the target ECMAScript object does not include at least one read-only property, the target ECMAScript object is proxied using the handler function objects defined in the object "HANDLERS". This will result in recursive proxying of the properties of the target ECMAScript object.

It should be noted that the function object "getHackHandlers" is defined to implement all the operations that are capable of being performed on an object. For instance, the function object "getHackHandlers" includes functions that replace the get, set, construct, defineProperty, deleteProperty, enumerate, getOwnPropertyDescriptor, getPrototypeOf, has, isExtensible, ownKeys, preventExtensions, and setPrototypeOf handlers. Whereas, the object "HANDLERS" is defined to implement selected (e.g., fewer than all) operations that are capable of being performed on an object (e.g., to provide faster and/or more efficient proxying than would occur by implementing all the operations that are capable of being performed). For instance, the object "HANDLERS" is shown in FIG. 9 to implement the get, apply, set, and construct handlers and to not implement the other handlers that are implemented in the function object "getHackHandlers".

It should be further noted that the empty function object that is created as shown in the code 900 actually includes some properties, which are created by default. Moreover, at least one of the properties is a read-only property. This point can be illustrated by a simple example in which typing "c=function( ) { }" results in f ( ) { }. If we were to then type "Object.getOwnPropertyNames(c)", we would see that the properties of "c" are "length", "name", "arguments", "caller", "prototype". It will be recognized that "prototype" is a read-only property, and proxying the empty function object as shown in FIG. 9 will result in an error. Thus, in addition to proxying a function object by creating an empty function object as shown in FIG. 9, default properties of the empty function object may be proxied to avoid the aforementioned error.

FIG. 10 shows example code 1000 that initiates proxying of a function object by creating an empty function object and proxying default properties of the empty function object in accordance with an embodiment. As shown in FIG. 10, if the target ECMAScript object includes at least one read-only property, a determination is made whether the type of the target ECMAScript object is a function. If the type of the target ECMAScript object is a function, proxying of the target ECMAScript object is initiated by creating an empty function object and proxying the default properties of the target ECMAScript object using the handler functions that are included in the object "HANDLERS". It should be noted that the values of the default properties are not changed. Accordingly, the default properties are proxied without changing the values of the default properties. The proxied function object is then returned using the handler functions that are included in the function object "getHackHandlers". For instance, the handler functions that are included in the function object "getHackHandlers" are applied to the properties of the target ECMAScript object to provide the proxied function object. Thus, the default properties are proxied before the handler functions that are included in the function object "getHackHandlers" are applied to the properties of the target ECMAScript object. By pre-proxying the default properties, the default properties need not be re-proxied. The pre-proxied default properties may be returned "as is" and remain compliant with the read-only restriction associated with the read-only properties.

If the target ECMAScript object is not a read-only object, the code 1000 continues as described above with reference to the code 900 of FIG. 9. In particular, if the target ECMAScript object includes at least one read-only property but the type of the target ECMAScript object is not a function, proxying of the target ECMAScript object is initiated by creating an object that has no properties using Object.create(null) and applying the handler functions that are included in the function object "getHackHandlers" to the target ECMAScript object. If the target ECMAScript object does not include at least one read-only property, the target ECMAScript object is proxied using the handler functions defined in the object "HANDLERS". This will result in recursive proxying of the properties of the target ECMAScript object.

Figure 11:
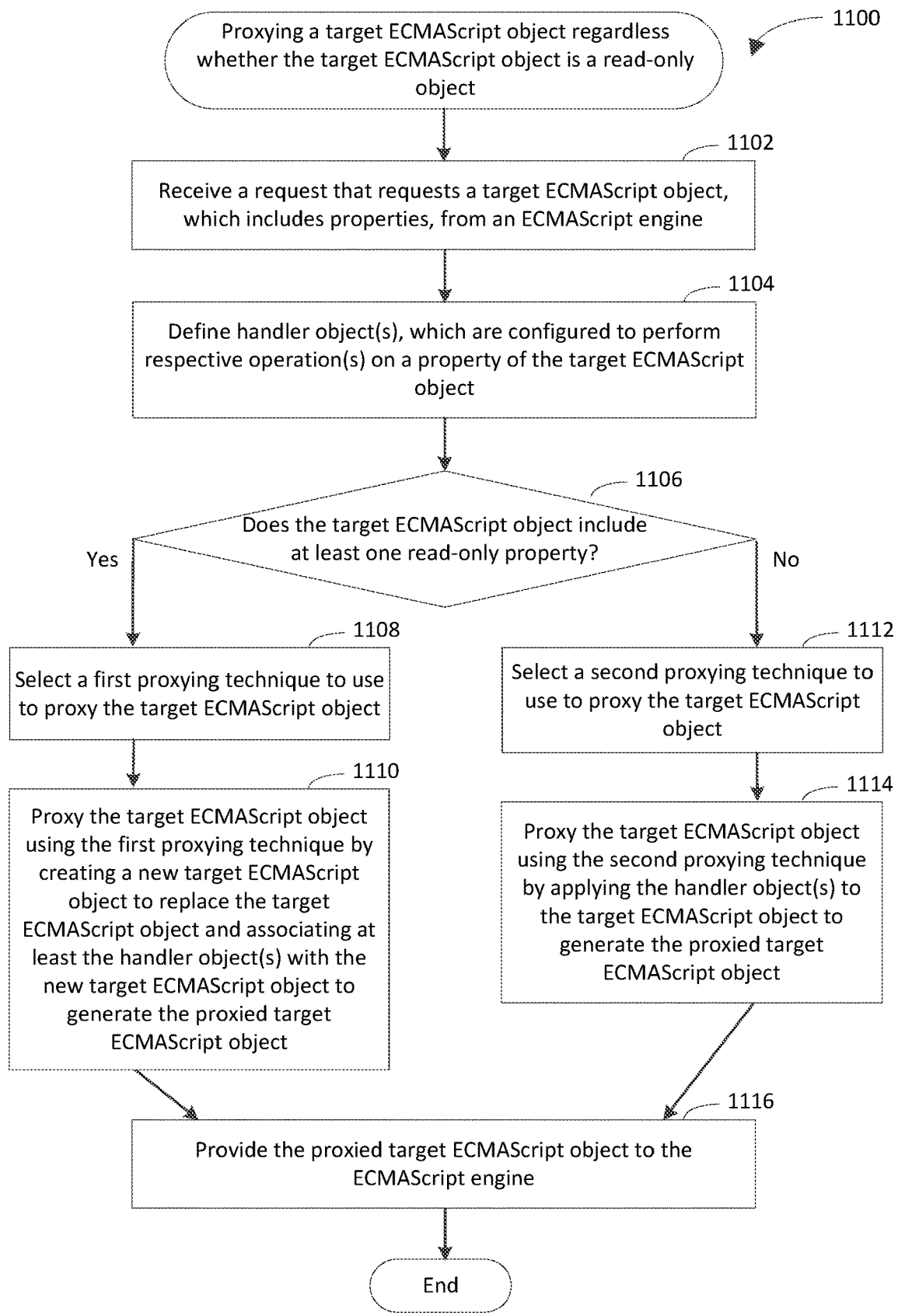
FIG. 11 depicts a flowchart of an example method for proxying a target ECMAScript object regardless whether the target ECMAScript object is a read-only object in accordance with an embodiment.
Figure 12:
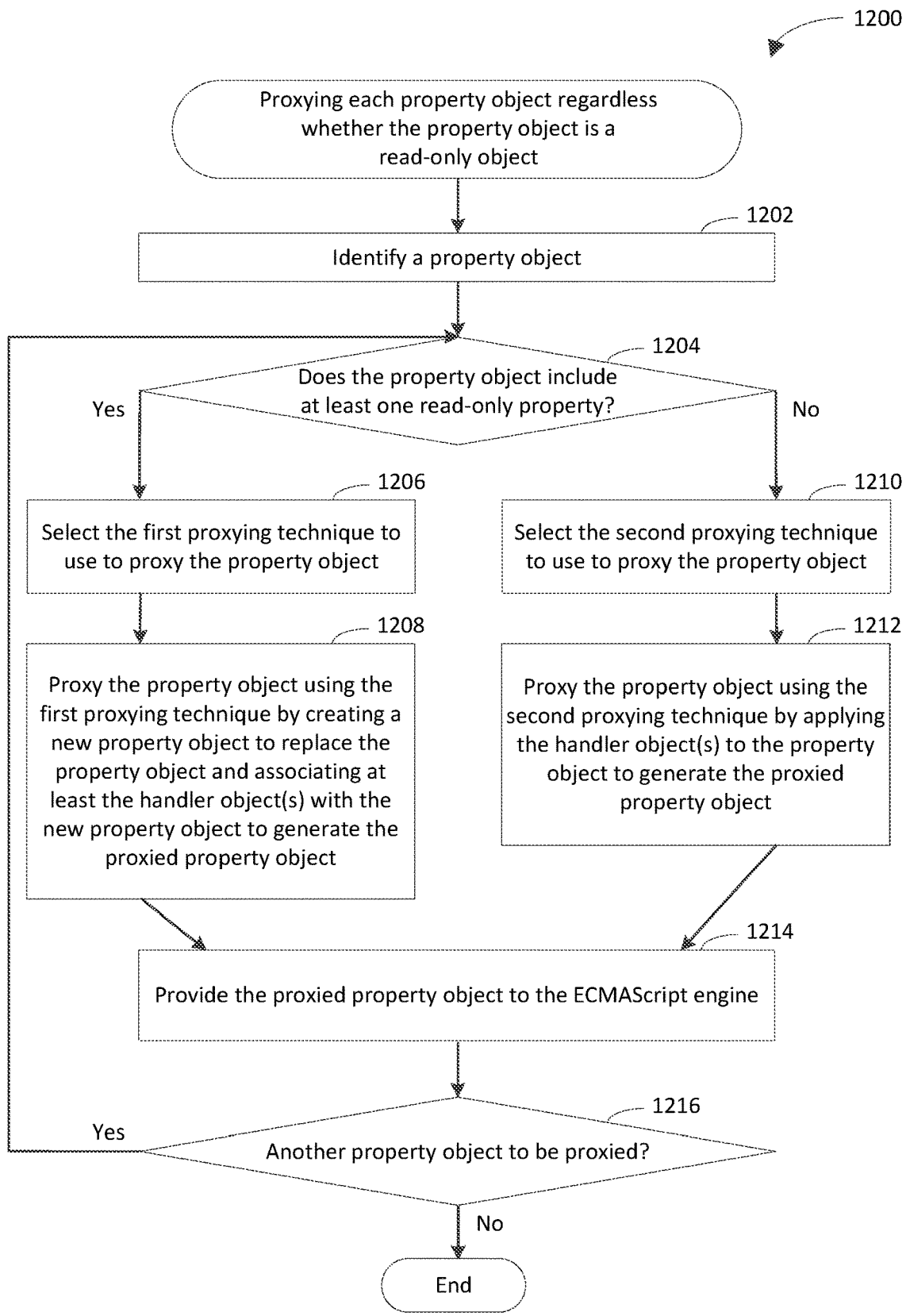
FIG. 12 depicts a flowchart of an example method for proxying each property object regardless whether the property object is a read-only object in accordance with an embodiment.
Figure 13:
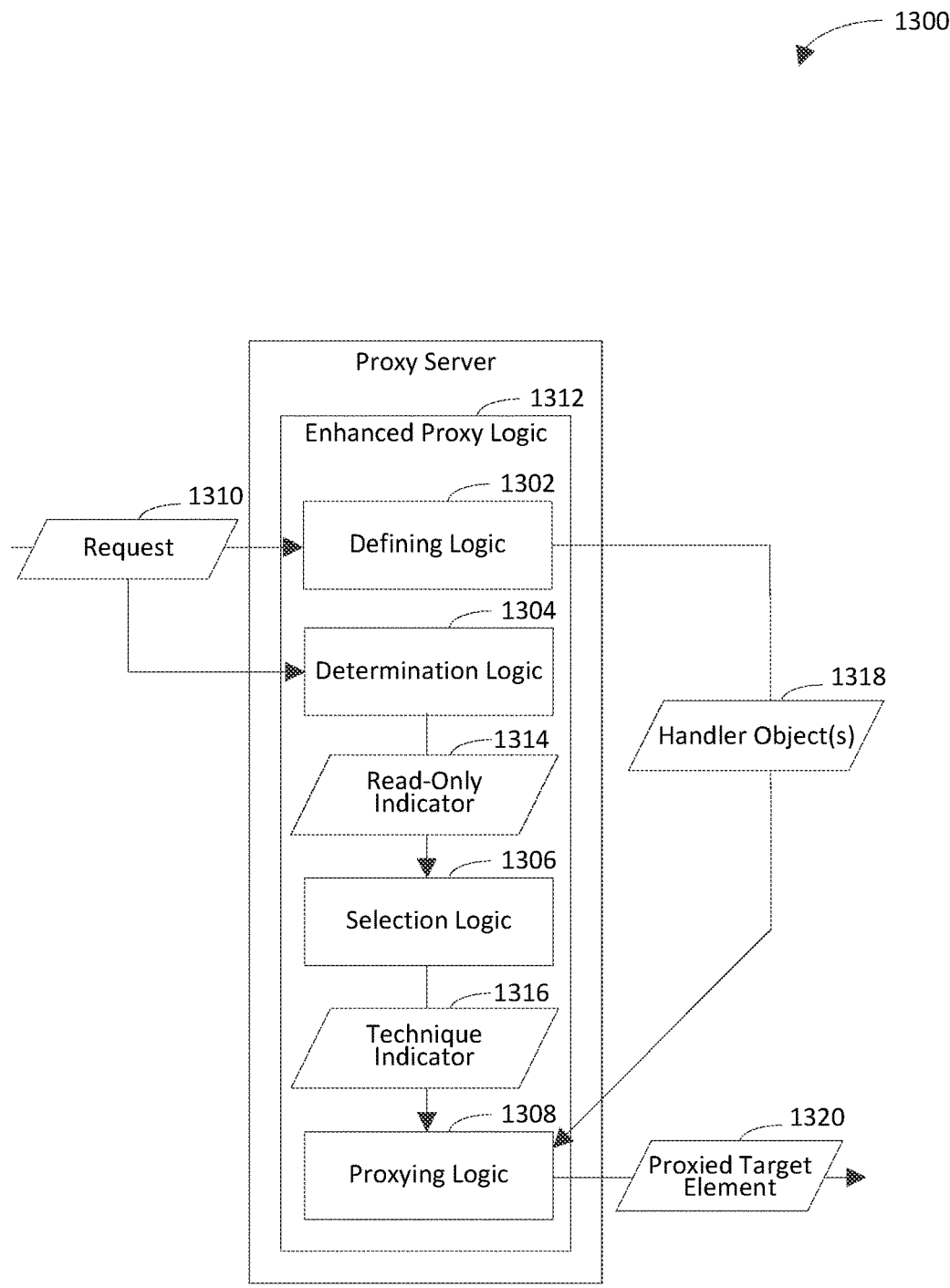
FIG. 13 is a block diagram of an example implementation of a proxy server shown in FIG. 1 in accordance with an embodiment.

FIG. 11 depicts a flowchart 1100 of an example method for proxying a target ECMAScript object regardless whether the target ECMAScript object is a read-only object in accordance with an embodiment. FIG. 12 depicts a flowchart 1200 of an example method for proxying each property object regardless whether the property object is a read-only object in accordance with an embodiment. Flowcharts 1100 and 1200 may be performed by enhanced proxy logic 112, 112B, or 112C shown in respective FIGS. 1A, 1B, and 1C, for example. For illustrative purposes, flowcharts 1100 and 1200 are described with respect to proxy server 1300 shown in FIG. 13. Proxy server 1300 includes enhanced proxy logic 1312, which is an example of enhanced proxy logic 112, 112B, or 112C, according to an embodiment. As shown in FIG. 13, enhanced proxy logic 1312 includes defining logic 1302, determination logic 1304, selection logic 1306, and proxying logic 1308. Further structural and operational embodiments will be apparent to persons skilled in the relevant art(s) based on the discussion regarding flowcharts 1100 and 1200.

As shown in FIG. 11, the method of flowchart 1100 begins at step 1102. In step 1102, a request that requests a target ECMAScript object is received from an ECMAScript engine. The target ECMAScript object includes properties. For instance, the target ECMAScript object may be a target read-only object. The target read-only object may be a target function object, though the scope of the example embodiments is not limited in this respect. A target ECMAScript object is of type "object". A target function object is of type "function" and is further of type "object". The type "function" takes precedence over the type "object." Thus, a target function object often is referred to as being of type "function" (e.g., without reference to the type "object"). In an example implementation, the defining logic 1302 and/or the determination logic 1304 receive a request 1310 for the target ECMAScript object from the ECMAScript engine.

At step 1104, handler object(s), which are configured to perform respective operation(s) on a property of the target ECMAScript object, are defined. In an example implementation, the defining logic 1302 defines handler object(s) 1318.

In an example embodiment, defining the handler object(s) at step 1104 includes binding the handler object(s) to the target ECMAScript object.

At step 1106, a determination is made whether the target ECMAScript object includes at least one read-only property. Each property of the target ECMAScript object is read-only if the property is not capable of being redefined (e.g., not capable of being redefined without causing an error to occur with respect to (e.g., during) proxying of the target ECMAScript object). Each property of the target ECMAScript object is not read-only if the property is capable of being redefined (e.g., capable of being redefined without causing an error to occur with respect to proxying of the target ECMAScript object). If the target ECMAScript object includes at least one read-only property, flow continues to step 1108. Otherwise, flow continued to step 1112. In an example implementation, the determination logic 1304 determines whether the target ECMAScript object includes at least one read-only property. Determination logic 1304 may generate a read-only indicator 1314 that indicates (e.g., specifies) whether the target ECMAScript object includes at least one read-only property. For example, the read-only indicator 1314 may have a first value (e.g., a binary "1") based on the target ECMAScript object having at least one read-only property. In another example, the read-only indicator may have a second value (e.g., a binary "0") based on the target ECMAScript object not having at least one read-only property.

In an example embodiment, determining whether the target ECMAScript object includes at least one read-only property at step 1106 includes determining whether the target ECMAScript object includes an ECMAScript property having an attribute specifying that the ECMAScript property is not configurable. The ECMAScript property having an attribute specifying that the ECMAScript property is not configurable indicates that the ECMAScript property is read-only. The ECMAScript property not having an attribute specifying that the ECMAScript property is not configurable indicates that the ECMAScript property is not read-only.

At step 1108, a first proxying technique is selected to use to proxy the target ECMAScript object. For example, the first proxying technique may be selected from multiple proxying techniques. In accordance with this example, the target ECMAScript object including at least one read-only property may indicate that the first proxying technique is to be selected from the multiple proxying techniques. The first proxy object may be selected at step 1108 based at least in part on (e.g., as a result of) the target ECMAScript object including at least one read-only property. In an example implementation, the selection logic 1306 selects the first proxying technique. For example, the selection logic 1306 may select the first proxying technique based on (e.g., based at least in part on) the target ECMAScript object having at least one read-only property. In accordance with this example, the selection logic 1306 may review the read-only indicator 1314 to determine that the read-only indicator 1314 indicates that the target ECMAScript object includes at least one read-only property. The read-only indicator 1314 indicating that the target ECMAScript object includes at least one read-only property may trigger the selection logic 1306 to select the first proxying technique. The selection logic 1306 may generate a technique indicator 1316 to indicate that the first proxying technique has been selected to be used to proxy the target ECMAScript object.

At step 1110, the target ECMAScript object is proxied using the first proxying technique by creating a new target ECMAScript object to replace the target ECMAScript object and associating at least the handler object(s) with the new target ECMAScript object to generate the proxied target ECMAScript object. Upon completion of step 1110, flow continues to step 1116. In an example implementation, the proxying logic 1308 proxies the target ECMAScript object using the first proxying technique. For instance, the proxying logic 1308 may proxy the target ECMAScript object using the first proxying technique in response to receipt of the technique indicator (e.g., based on the technique indicator 1316 indicating that the first proxying technique has been selected to be used to proxy the target ECMAScript object. In accordance with this implementation, the proxying logic 1308 proxies the target ECMAScript object using the first proxying technique by creating the new target ECMAScript object to replace the target ECMAScript object and associating at least the handler object(s) 1318 with the new target ECMAScript object to generate the proxied target ECMAScript object 1320.

At step 1112, a second proxying technique is selected to use to proxy the target ECMAScript object. For example, the second proxying technique may be selected from multiple proxying techniques. In accordance with this example, the target ECMAScript object not including at least one read-only property may indicate that the second proxying technique is to be selected from the multiple proxying techniques. The second proxy object may be selected at step 1112 based at least in part on (e.g., as a result of) the target ECMAScript object not including at least one read-only property. In an example implementation, the selection logic 1306 selects the second proxying technique. For example, the selection logic 1306 may select the second proxying technique based on (e.g., based at least in part on) the target ECMAScript object not having at least one read-only property. In accordance with this example, the selection logic 1306 may review the read-only indicator 1314 to determine that the read-only indicator 1314 indicates that the target ECMAScript object does not include at least one read-only property. The read-only indicator 1314 indicating that the target ECMAScript object does not include at least one read-only property may trigger the selection logic 1306 to select the second proxying technique. The selection logic 1306 may generate the technique indicator 1316 to indicate that the second proxying technique has been selected to be used to proxy the target ECMAScript object.

At step 1114, the target ECMAScript object is proxied using the second proxying technique by applying the handler object(s) to the target ECMAScript object to generate the proxied target ECMAScript object. Upon completion of step 1114, flow continues to step 1116. In an example implementation, the proxying logic 1308 proxies the target ECMAScript object using the second proxying technique. For instance, the proxying logic 1308 may proxy the target ECMAScript object using the second proxying technique in response to receipt of the technique indicator (e.g., based on the technique indicator 1316 indicating that the second proxying technique has been selected to be used to proxy the target ECMAScript object. In accordance with this implementation, the proxying logic 1308 proxies the target ECMAScript object using the second proxying technique by applying the handler object(s) 1318 to the target ECMAScript object to generate the proxied target ECMAScript object 1320.

At step 1116, the proxied target ECMAScript object is provided to the ECMAScript engine. For instance, the proxied target ECMAScript object may be provided to the ECMAScript engine in response to (e.g., based at least in part on) receipt of the request that requests the target ECMAScript object. In an example implementation, the proxy logic 1308 provides the proxied target ECMAScript object 1320 to the ECMAScript engine (e.g., in response to the request 1310).

In an example embodiment, defining the handler object(s) at step 1104 includes defining a plurality of handler objects, which are configured to perform a plurality of respective operations on a property of the target ECMAScript object. The plurality of handler objects includes the handler object(s). In further accordance with this embodiment, proxying the target ECMAScript object using the first proxying technique at step 1110 includes initiating proxying of the target ECMAScript object using the new target ECMAScript object, which initially has no read-only properties, and adding at least a portion of the plurality of handler objects to the new target ECMAScript object to generate the proxied target ECMAScript object using the first proxying technique, based at least in part on the target ECMAScript object including at least one read-only property.

In an aspect of this embodiment, proxying the target ECMAScript object using the first proxying technique at step 1110 includes initiating proxying of the target ECMAScript object using the new target ECMAScript object, which initially has no properties, and adding the plurality of handler objects to the new target ECMAScript object to generate the proxied target ECMAScript object using the first proxying technique, based at least in part on the target ECMAScript object including at least one read-only property. For instance, hooks may be called on the target ECMAScript object rather than the new target ECMAScript object. It may be said that the proxy of the target ECMAScript object is initialized on the new target ECMAScript object.

In another aspect of this embodiment, proxying the target ECMAScript object using the first proxying technique at step 1110 includes creating the new target ECMAScript object based on (e.g., with) a null prototype. The null prototype may be used as an argument of object.create to create the new target ECMAScript object.

In another example embodiment, the target ECMAScript object is a target function object, and the new target ECMAScript object is a new target function object. In accordance with this embodiment, defining the handler object(s) at step 1104 includes defining a plurality of handler objects, which are configured to perform a plurality of respective operations on a property of the target function object. The plurality of handler objects includes the handler object(s). In further accordance with this embodiment, proxying the target ECMAScript object using the first proxying technique at step 1110 includes initiating proxying of the target function object using the new target function object, which initially has one or more function properties, applying the handler object(s) to the one or more function properties, and adding the plurality of handler objects to the new target function object to generate the proxied target ECMAScript object using the first proxying technique, based at least in part on the target function object including at least one read-only property. For instance, applying the handler object(s) to the one or more function properties may include over-writing pre-defined (e.g., default) properties of the new target function object to be respective proxies of the respective pre-defined properties.

In some example embodiments, one or more steps 1102, 1104, 1106, 1108, 1110, 1112, 1114, and/or 1116 of flowchart 1100 may not be performed. Moreover, steps in addition to or in lieu of steps 1102, 1104, 1106, 1108, 1110, 1112, 1114, and/or 1116 may be performed. For instance, in an example embodiment, the method of flowchart 1100 includes wrapping the target ECMAScript object by inserting a prepend statement to a beginning of each ECMAScript script of the target ECMAScript object and an append statement to an end of the respective ECMAScript script to provide a proxied object tree of the target ECMAScript object. Each of the prepend statement and the append statement may be a line of code. A wrapper is one example type of a "hook." A hook is one or more lines of code that are inserted into a web page (e.g., in a script embedded therein) to wrap an object therein, to change behavior of the web page, and/or to react in response to (e.g., based on) occurrence of an event. Accordingly, wrapping an object in a wrapper may be referred to in a broader sense herein as "hooking" the object or an action that is performed as a result of executing the object.

In another example embodiment, a hierarchical object structure includes multiple hierarchical levels. The hierarchical levels including a top level and one or more sub-levels that are below the top level. The target ECMAScript object is a root of the hierarchical object structure in the top level. An object that defines a property is referred to as a property object. Each property of an object is represented by a property object in a sub-level immediately below the hierarchical level that includes the respective object. In accordance with this embodiment, the method of flowchart 1100 includes one or more of the steps shown in flowchart 1200 of FIG. 12. As shown in FIG. 12, the method of flowchart 1200 begins at step 1202. In step 1202, a property object is identified. In an example implementation, determination logic 1304 identifies the property object.

At step 1204, a determination is made whether the property object includes at least one read-only property. Each property of the property object is read-only if the property is not capable of being redefined (e.g., not capable of being redefined without causing an error to occur with respect to (e.g., during) proxying of the property object). Each property of the property object is not read-only if the property is capable of being redefined (e.g., capable of being redefined without causing an error to occur with respect to proxying of the property object). If the property object includes at least one read-only property, flow continues to step 1206. Otherwise, flow continued to step 1210. In an example implementation, the determination logic 1304 determines whether the property object includes at least one read-only property. Determination logic 1304 may generate the read-only indicator 1314 to indicate whether the property object includes at least one read-only property. For example, the read-only indicator 1314 may have a first value based on the property object having at least one read-only property. In another example, the read-only indicator may have a second value based on the property object not having at least one read-only property.

At step 1206, a first proxying technique is selected to use to proxy the property object (e.g., based at least in part on the property object including at least one read-only property. In an example implementation, the selection logic 1306 selects the first proxying technique. In accordance with this implementation, the selection logic 1306 may review the read-only indicator 1314 to determine that the read-only indicator 1314 indicates that the property object includes at least one read-only property. The selection logic 1306 may select the first proxying technique based at least in part on the read-only indicator 1314 indicating that the property object includes at least one read-only property.

At step 1208, the property object is proxied using the first proxying technique by creating a new property object to replace the property object and associating at least the handler object(s) with the new property object to generate the proxied property object. Upon completion of step 1208, flow continues to step 1214. In an example implementation, the proxying logic 1308 proxies the property object using the first proxying technique. For instance, the proxying logic 1308 may proxy the property object using the first proxying technique in response to receipt of the technique indicator (e.g., based on the technique indicator 1316 indicating that the first proxying technique has been selected to be used to proxy the property object). In accordance with this implementation, the proxying logic 1308 proxies the property object using the first proxying technique by creating the new property object to replace the property object and associating at least the handler object(s) 1318 with the new property object to generate the proxied property object.

At step 1210, a second proxying technique is selected to use to proxy the property object (e.g., based at least in part on the property object not including at least one read-only property). In an example implementation, the selection logic 1306 selects the second proxying technique. In accordance with this implementation, the selection logic 1306 may review the read-only indicator 1314 to determine that the read-only indicator 1314 indicates that the property object does not include at least one read-only property. The selection logic 1306 may select the second proxying technique based at least in part on the read-only indicator 1314 indicating that the property object does not include at least one read-only property.

At step 1212, the property object is proxied using the second proxying technique by applying the handler object(s) to the property object to generate the proxied property object. Upon completion of step 1212, flow continues to step 1214. In an example implementation, the proxying logic 1308 proxies the property object using the second proxying technique. For instance, the proxying logic 1308 may proxy the property object using the second proxying technique in response to receipt of the technique indicator (e.g., based on the technique indicator 1316 indicating that the second proxying technique has been selected to be used to proxy the property object). In accordance with this implementation, the proxying logic 1308 proxies the property object using the second proxying technique by applying the handler object(s) 1318 to the property object to generate the proxied property object.

At step 1214, the proxied property object is provided to the ECMAScript engine. In an example implementation, the proxy logic 1308 provides the proxied property object to the ECMAScript engine.

At step 1216, a determination is made whether another property object is to be proxied. If another property object is to be proxied, flow returns to step 1204. Otherwise, flowchart 1200 ends. In an example implementation, the determination logic 1304 determines whether another property object is to be proxied.

It will be recognized that the proxy server 1300 may not include one or more of defining logic 1302, determination logic 1304, selection logic 1306, proxying logic 1308, and/or enhanced proxy logic 1312. Furthermore, the proxy server 1300 may include components in addition to or in lieu of defining logic 1302, determination logic 1304, selection logic 1306, proxying logic 1308, and/or enhanced proxy logic 1312.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of browser 110, enhanced proxy logic 112, enhanced proxy logic 112B, enhanced proxy logic 112C, client-side ECMAScript engine 114A, server-side ECMAScript engine 114B, defining logic 1302, determination logic 1304, selection logic 1306, proxying logic 1308, enhanced proxy logic 1312, flowchart 1100, and/or flowchart 1200 may be implemented in hardware, software, firmware, or any combination thereof.

For example, any one or more of browser 110, enhanced proxy logic 112, enhanced proxy logic 112B, enhanced proxy logic 112C, client-side ECMAScript engine 114A, server-side ECMAScript engine 114B, defining logic 1302, determination logic 1304, selection logic 1306, proxying logic 1308, enhanced proxy logic 1312, flowchart 1100, and/or flowchart 1200 may be implemented, at least in part, as computer program code configured to be executed in one or more processors.

In another example, any one or more of browser 110, enhanced proxy logic 112, enhanced proxy logic 112B, enhanced proxy logic 112C, client-side ECMAScript engine 114A, server-side ECMAScript engine 114B, defining logic 1302, determination logic 1304, selection logic 1306, proxying logic 1308, enhanced proxy logic 1312, flowchart 1100, and/or flowchart 1200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

A first example system to proxy a target ECMAScript object regardless whether the target ECMAScript object is a read-only object comprises memory and one or more processors coupled to the memory. The one or more processors are configured to receive a request that requests a target ECMAScript object, which includes a plurality of properties, from an ECMAScript engine. The one or more processors are further configured to define one or more handler objects, which are configured to perform one or more respective operations on a property of the target ECMAScript object. The one or more processors are further configured to determine whether the target ECMAScript object includes at least one read-only property. Each property of the target ECMAScript object is read-only if the property is not capable of being redefined. Each property of the target ECMAScript object is not read-only if the property is capable of being redefined. The one or more processors are further configured to select a proxying technique from a plurality of proxying techniques to use to proxy the target ECMAScript object based at least in part on whether the target ECMAScript object includes at least one read-only property. The plurality of proxying techniques includes a first proxying technique and a second proxying technique. The target ECMAScript object including at least one read-only property indicates that the first proxying technique is to be selected from the plurality of proxying techniques. The target ECMAScript object not including at least one read-only property indicates that the second proxying technique is to be selected from the plurality of proxying techniques. The one or more processors are further configured to proxy the target ECMAScript object using the selected proxying technique to generate a proxied target ECMAScript object in response to the request that requests the target ECMAScript object, said proxy the target ECMAScript object comprising: create a new target ECMAScript object to replace the target ECMAScript object and associate at least the one or more handler objects with the new target ECMAScript object to generate the proxied target ECMAScript object using the first proxying technique based at least in part on the target ECMAScript object including at least one read-only property; or apply the one or more handler objects to the target ECMAScript object to generate the proxied target ECMAScript object using the second proxying technique based at least in part on the target ECMAScript object not including at least one read-only property.

In a first aspect of the first example system, the one or more processors are configured to define a plurality of handler objects, which are configured to perform a plurality of respective operations on a property of the target ECMAScript object. In accordance with the first aspect, the plurality of wrapped handler objects includes the one or more wrapped handler objects. In further accordance with the first aspect, the one or more processors are configured to initiate proxying of the target ECMAScript object using the new target ECMAScript object, which initially has no read-only properties, and add at least a portion of the plurality of handler objects to the new target ECMAScript object to generate the proxied target ECMAScript object using the first proxying technique, based at least in part on the target ECMAScript object including at least one read-only property.

In a first implementation of the first aspect of the first example system, the one or more processors are configured to initiate proxying of the target ECMAScript object using the new target ECMAScript object, which initially has no properties, and add the plurality of handler objects to the new target ECMAScript object to generate the proxied target ECMAScript object using the first proxying technique, based at least in part on the target ECMAScript object including at least one read-only property.

In a second implementation of the first aspect of the first example system, the one or more processors are configured to create the new target ECMAScript object based on a null prototype.

In a second aspect of the first example system, the target ECMAScript object is a target function object. In accordance with the second aspect, the new target ECMAScript object is a new target function object. In further accordance with the second aspect, the one or more processors are configured to define a plurality of handler objects, which are configured to perform a plurality of respective operations on a property of the target function object. The plurality of handler objects includes the one or more handler objects. In further accordance with the second aspect, the one or more processors are configured to initiate proxying of the target function object using the new target function object, which initially has one or more function properties, apply the one or more handler objects to the one or more function properties, and add the plurality of handler objects to the new target function object to generate the proxied target ECMAScript object using the first proxying technique, based at least in part on the target function object including at least one read-only property. The second aspect of the first example system may be implemented in combination with the first aspect of the first example system, though the example embodiments are not limited in this respect.

In a third aspect of the first example system, the one or more processors are configured to define the one or more handler objects by binding the one or more handler objects to the target ECMAScript object. The third aspect of the first example system may be implemented in combination with the first and/or second aspect of the first example system, though the example embodiments are not limited in this respect.

In a fourth aspect of the first example system, a hierarchical object structure includes a plurality of hierarchical levels. The plurality of hierarchical levels includes a top level and one or more sub-levels that are below the top level. In accordance with the fourth aspect, the target ECMAScript object is a root of the hierarchical object structure in the top level, and each property of an object is represented by a property object in a sub-level immediately below the hierarchical level that includes the respective object. In further accordance with the fourth aspect, the one or more processors are configured to, for each property object, determine whether the property object includes at least one read-only property. In further accordance with the fourth aspect, the one or more processors are configured to, for each property object, select a proxying technique from the plurality of proxying techniques to use to proxy the property object based at least in part on whether the property object includes at least one read-only property. The plurality of proxying techniques includes the first proxying technique and the second proxying technique. The property object including at least one read-only property indicates that the first proxying technique is to be selected from the plurality of proxying techniques. The property object not including at least one read-only property indicates that the second proxying technique is to be selected from the plurality of proxying techniques. In further accordance with the fourth aspect, the one or more processors are configured to, for each property object, proxy the property object using the selected proxying technique to generate a proxied property object, said proxy the property object comprising: create a new property object to replace the property object and associate at least the one or more handler objects with the new property object to generate the proxied property object using the first proxying technique based at least in part on the property object including at least one read-only property; or apply the one or more handler objects to each property of the property object to generate the proxied property object using the second proxying technique based at least in part on the property object not including at least one read-only property. The fourth aspect of the first example system may be implemented in combination with the first, second, and/or third aspect of the first example system, though the example embodiments are not limited in this respect.

In a fifth aspect of the first example system, the one or more processors are configured to wrap the target ECMAScript object by inserting a prepend statement to a beginning of each ECMAScript script and an append statement to an end of the respective ECMAScript script to provide a proxied object tree of the target ECMAScript object.

In a sixth aspect of the first example system, the one or more processors are configured to determine whether the target ECMAScript object includes at least one read-only property by determining whether the target ECMAScript object includes an ECMAScript property having an attribute specifying that the ECMAScript property is not configurable. The ECMAScript property having an attribute specifying that the ECMAScript property is not configurable indicates that the ECMAScript property is read-only. The ECMAScript property not having an attribute specifying that the ECMAScript property is not configurable indicates that the ECMAScript property is not read-only. The sixth aspect of the first example system may be implemented in combination with the first, second, third, fourth, and/or fifth aspect of the first example system, though the example embodiments are not limited in this respect.

A second example system comprises memory and one or more processors coupled to the memory. The one or more processors are configured to determine whether a requested target ECMAScript object includes at least one read-only property. Each property of the requested target ECMAScript object is read-only if the property is not capable of being redefined. Each property of the requested target ECMAScript object is not read-only if the property is capable of being redefined. The one or more processors are further configured to proxy the requested target ECMAScript object to generate a proxied target ECMAScript object based at least in part on a determination that the requested target ECMAScript object includes at least one read-only property by performing operations. The operations comprise create a new target ECMAScript object to replace the requested target ECMAScript object. The operations further comprise associate a plurality of handler objects, which are configured to perform a plurality of respective operations on a property of the requested target ECMAScript object, with the new target ECMAScript object to generate the proxied target ECMAScript object.

In a first aspect of the second example system, the one or more processors are configured to proxy the requested target ECMAScript object based at least in part on the determination that the requested target ECMAScript object includes at least one read-only property by performing the operations comprising: create the new target ECMAScript object to initially have no read-only properties; and add at least a portion of the plurality of handler objects to the new target ECMAScript object to generate the proxied target ECMAScript object.

In a second aspect of the second example system, the requested target ECMAScript object is a target function object. In accordance with the second aspect, the new target ECMAScript object is a new target function object. In further accordance with the second aspect, the one or more processors are configured to proxy the requested target ECMAScript object based at least in part on the determination that the requested target ECMAScript object includes at least one read-only property by performing the operations comprising: create the new target function object to initially have one or more function properties; apply one or more handler objects of the plurality of handler objects to the one or more function properties; and add the plurality of handler objects to the new target function object to generate the proxied target ECMAScript object.

In a first example method of proxying a target ECMAScript object regardless whether the target ECMAScript object is a read-only object, a request that requests a target ECMAScript object, which includes a plurality of properties, is received from an ECMAScript engine. One or more handler objects, which are configured to perform one or more respective operations on a property of the target ECMAScript object, are defined. A determination is made whether the target ECMAScript object includes at least one read-only property. Each property of the target ECMAScript object is read-only if the property is not capable of being redefined. Each property of the target ECMAScript object is not read-only if the property is capable of being redefined. A proxying technique is selected from a plurality of proxying techniques to use to proxy the target ECMAScript object based at least in part on whether the target ECMAScript object includes at least one read-only property. The plurality of proxying techniques includes a first proxying technique and a second proxying technique. The target ECMAScript object including at least one read-only property indicates that the first proxying technique is to be selected from the plurality of proxying techniques. The target ECMAScript object not including at least one read-only property indicates that the second proxying technique is to be selected from the plurality of proxying techniques. The target ECMAScript object is proxied using the selected proxying technique to generate a proxied target ECMAScript object in response to the request that requests the target ECMAScript object, said proxying the target ECMAScript object comprising: creating a new target ECMAScript object to replace the target ECMAScript object and associating at least the one or more handler objects with the new target ECMAScript object to generate the proxied target ECMAScript object using the first proxying technique based at least in part on the target ECMAScript object including at least one read-only property; or applying the one or more handler objects to the target ECMAScript object to generate the proxied target ECMAScript object using the second proxying technique based at least in part on the target ECMAScript object not including at least one read-only property.

In a first aspect of the first example method, defining the one or more handler objects comprises defining a plurality of handler objects, which are configured to perform a plurality of respective operations on a property of the target ECMAScript object. The plurality of handler objects includes the one or more handler objects. In accordance with the first aspect, proxying the target ECMAScript object comprises initiating proxying of the target ECMAScript object using the new target ECMAScript object, which initially has no read-only properties, and adding at least a portion of the plurality of handler objects to the new target ECMAScript object to generate the proxied target ECMAScript object using the first proxying technique, based at least in part on the target ECMAScript object including at least one read-only property.

In a first implementation of the first aspect of the first example method, proxying the target ECMAScript object comprises initiating proxying of the target ECMAScript object using the new target ECMAScript object, which initially has no properties, and adding the plurality of handler objects to the new target ECMAScript object to generate the proxied target ECMAScript object using the first proxying technique, based at least in part on the target ECMAScript object including at least one read-only property.

In a second implementation of the first aspect of the first example method, proxying the target ECMAScript object comprises creating the new target ECMAScript object based on a null prototype.

In a second aspect of the first example method, the target ECMAScript object is a target function object. In accordance with the second aspect, the new target ECMAScript object is a new target function object. In further accordance with the second aspect, defining the one or more handler objects comprises defining a plurality of handler objects, which are configured to perform a plurality of respective operations on a property of the target function object. The plurality of handler objects includes the one or more handler objects. In further accordance with the second aspect, proxying the target ECMAScript object comprises initiating proxying of the target function object using the new target function object, which initially has one or more function properties, applying the one or more handler objects to the one or more function properties, and adding the plurality of handler objects to the new target function object to generate the proxied target ECMAScript object using the first proxying technique, based at least in part on the target function object including at least one read-only property. The second aspect of the first example method may be implemented in combination with the first aspect of the first example method, though the example embodiments are not limited in this respect.

In a third aspect of the first example method, defining the one or more handler objects comprises binding the one or more handler objects to the target ECMAScript object. The third aspect of the first example method may be implemented in combination with the first and/or second aspect of the first example method, though the example embodiments are not limited in this respect.

In a fourth aspect of the first example method, a hierarchical object structure includes a plurality of hierarchical levels. The plurality of hierarchical levels includes a top level and one or more sub-levels that are below the top level. In accordance with the fourth aspect, the target ECMAScript object is a root of the hierarchical object structure in the top level, and each property of an object is represented by a property object in a sub-level immediately below the hierarchical level that includes the respective object. In further accordance with the fourth aspect, the method further comprises, for each property object, determining whether the property object includes at least one read-only property. In further accordance with the fourth aspect, the method further comprises, for each property object, selecting a proxying technique from the plurality of proxying techniques to use to proxy the property object based at least in part on whether the property object includes at least one read-only property. The plurality of proxying techniques includes the first proxying technique and the second proxying technique. The property object including at least one read-only property indicates that the first proxying technique is to be selected from the plurality of proxying techniques. The property object not including at least one read-only property indicates that the second proxying technique is to be selected from the plurality of proxying techniques. In further accordance with the fourth aspect, the method further comprises, for each property object, proxying the property object using the selected proxying technique to generate a proxied property object, said proxy the property object comprising: creating a new property object to replace the property object and associating at least the one or more handler objects with the new property object to generate the proxied property object using the first proxying technique based at least in part on the property object including at least one read-only property; or applying the one or more handler objects to each property of the property object to generate the proxied property object using the second proxying technique based at least in part on the property object not including at least one read-only property. The fourth aspect of the first example method may be implemented in combination with the first, second, and/or third aspect of the first example method, though the example embodiments are not limited in this respect.

In a fifth aspect of the first example method, the first example method comprises wrapping the target EMCAScript object by inserting a prepend statement to a beginning of each ECMAScript script and an append statement to an end of the respective ECMAScript script to provide a proxied object tree of the target ECMAScript object. The fifth aspect of the first example method may be implemented in combination with the first, second, third, and/or fourth aspect of the first example method, though the example embodiments are not limited in this respect.

In a sixth aspect of the first example method, determining whether the target ECMAScript object includes at least one read-only property comprises determining whether the target ECMAScript object includes an ECMAScript property having an attribute specifying that the ECMAScript property is not configurable. The ECMAScript property having an attribute specifying that the ECMAScript property is not configurable indicates that the ECMAScript property is read-only. The ECMAScript property not having an attribute specifying that the ECMAScript property is not configurable indicates that the ECMAScript property is not read-only. The sixth aspect of the first example method may be implemented in combination with the first, second, third, fourth, and/or fifth aspect of the first example method, though the example embodiments are not limited in this respect.

In a second example method, a determination is made that a requested target ECMAScript object includes at least one read-only property. Each property of the requested target ECMAScript object is read-only if the property is not capable of being redefined. Each property of the requested target ECMAScript object is not read-only if the property is capable of being redefined. The requested target ECMAScript object is proxied to generate a proxied target ECMAScript object based at least in part on determining that the requested target ECMAScript object includes at least one read-only property by performing operations. The operations comprise creating a new target ECMAScript object to replace the requested target ECMAScript object. The operations further comprise associating a plurality of handler objects, which are configured to perform a plurality of respective operations on a property of the requested target ECMAScript object, with the new target ECMAScript object to generate the proxied target ECMAScript object.

In a first aspect of the second example method, creating the new target ECMAScript object comprises creating the new target ECMAScript object to initially have no read-only properties. In accordance with the first aspect, associating the plurality of handler objects with the new target ECMAScript object comprises adding at least a portion of the plurality of handler objects to the new target ECMAScript object to generate the proxied target ECMAScript object.

In a second aspect of the second example method, the requested target ECMAScript object is a target function object. In accordance with the second aspect, the new target ECMAScript object is a new target function object. In further accordance with the second aspect, creating the new target ECMAScript object comprises creating the new target function object to initially have one or more function properties. In further accordance with the second aspect, associating the plurality of handler objects with the new target ECMAScript object comprises applying one or more handler objects of the plurality of handler objects to the one or more function properties. In further accordance with the second aspect, associating the plurality of handler objects with the new target ECMAScript object further comprises adding the plurality of handler objects to the new target function object to generate the proxied target ECMAScript object.

A first example computer program product comprises a computer-readable storage medium having instructions recorded thereon for enabling a processor-based system to perform operations to proxy a target ECMAScript object regardless whether the target ECMAScript object is a read-only object. The operations comprise define one or more handler objects, which are configured to perform one or more respective operations on a property of the target ECMAScript object. The target ECMAScript object includes a plurality of properties. The operations further comprise determine whether the target ECMAScript object includes at least one read-only property based at least in part on receipt of a request that requests the target ECMAScript object from an ECMAScript engine. Each property of the target ECMAScript object is read-only if the property is not capable of being redefined. Each property of the target ECMAScript object is not read-only if the property is capable of being redefined. The operations further comprise select a proxying technique from a plurality of proxying techniques to use to proxy the target ECMAScript object based at least in part on whether the target ECMAScript object includes at least one read-only property. The plurality of proxying techniques includes a first proxying technique and a second proxying technique. The target ECMAScript object including at least one read-only property indicates that the first proxying technique is to be selected from the plurality of proxying techniques. The target ECMAScript object not including at least one read-only property indicates that the second proxying technique is to be selected from the plurality of proxying techniques. The operations further comprise proxy the target ECMAScript object using the selected proxying technique to generate a proxied target ECMAScript object in response to the request that requests the target ECMAScript object, said proxy the target ECMAScript object comprising: create a new target ECMAScript object to replace the target ECMAScript object and associate at least the one or more handler objects with the new target ECMAScript object to generate the proxied target ECMAScript object using the first proxying technique based at least in part on the target ECMAScript object including at least one read-only property; or apply the one or more handler objects to the target ECMAScript object to generate the proxied target ECMAScript object using the second proxying technique based at least in part on the target ECMAScript object not including at least one read-only property.

In an aspect of the first example computer program product, the operations comprise define a plurality of handler objects, which are configured to perform a plurality of respective operations on a property of the target ECMAScript object. The plurality of handler objects includes the one or more handler objects. In accordance with this aspect, the operations comprise initiate proxying of the target ECMAScript object using the new target ECMAScript object, which initially has no read-only properties, and add at least a portion of the plurality of handler objects to the new target ECMAScript object to generate the proxied target ECMAScript object using the first proxying technique, based at least in part on the target ECMAScript object including at least one read-only property.

A second example computer program product comprises a computer-readable storage medium having instructions recorded thereon for enabling a processor-based system to perform operations. The operations comprise determine that a requested target ECMAScript object includes at least one read-only property. Each property of the requested target ECMAScript object is read-only if the property is not capable of being redefined. Each property of the requested target ECMAScript object is not read-only if the property is capable of being redefined. The operations further comprise proxy the requested target ECMAScript object to generate a proxied target ECMAScript object based at least in part on a determination that the requested target ECMAScript object includes at least one read-only property by performing the following: create a new target ECMAScript object to replace the requested target ECMAScript object; and associate a plurality of handler objects, which are configured to perform a plurality of respective operations on a property of the requested target ECMAScript object, with the new target ECMAScript object to generate the proxied target ECMAScript object.

IV. Example Computer System

Figure 14:
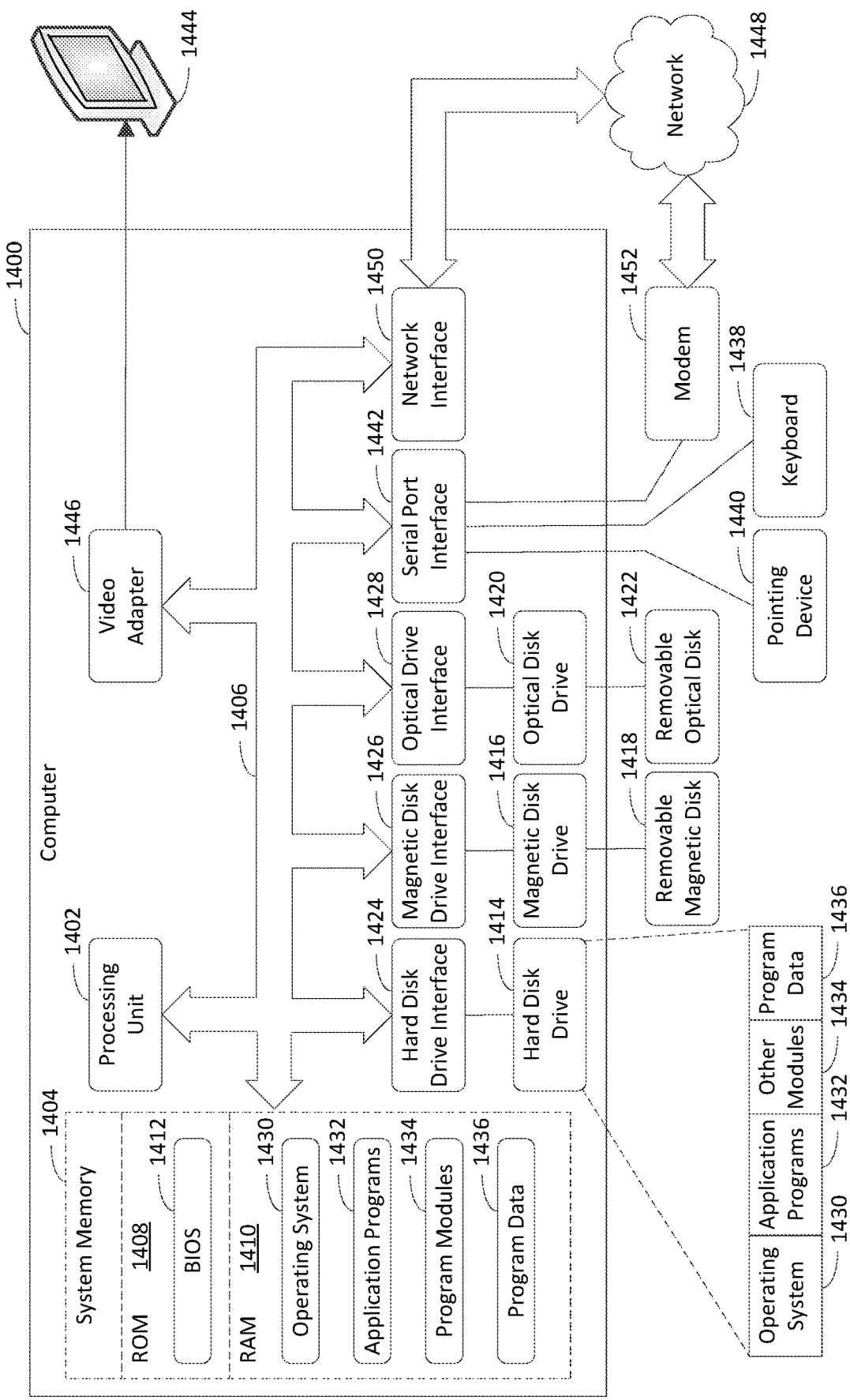
FIG. 14 depicts an example computer in which embodiments may be implemented.

FIG. 14 depicts an example computer 1400 in which embodiments may be implemented. Any one or more of user devices 102A-102M and/or any one or more of web servers 106A-106N shown in FIGS. 1A-1C; proxy server 108 shown in FIG. 1A; forward proxy server 108B shown in FIG. 1B; reverse proxy server 108C shown in FIG. 1C; and/or proxy server 1300 shown in FIG. 13 may be implemented using computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic for implementing any one or more of (e.g., at least a portion of) browser 110, enhanced proxy logic 112, enhanced proxy logic 112B, enhanced proxy logic 112C, client-side ECMAScript engine 114A, server-side ECMAScript engine 114B, defining logic 1302, determination logic 1304, selection logic 1306, proxying logic 1308, enhanced proxy logic 1312, flowchart 1100 (including any step of flowchart 1100), and/or flowchart 1200 (including any step of flowchart 1200), as described herein.

A user may enter commands and information into the computer 1400 through input devices such as keyboard 1438 and pointing device 1440. Other input devices (not shown) may include a microphone, joystick, game pad, satellite dish, scanner, touch screen, camera, accelerometer, gyroscope, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 (e.g., a monitor) is also connected to bus 1406 via an interface, such as a video adapter 1446. In addition to display device 1444, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable storage medium" are used to generally refer to media (e.g., non-transitory media) such as the hard disk associated with hard disk drive 1414, removable magnetic disk 1418, removable optical disk 1422, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments discussed herein. Accordingly, such computer programs represent controllers of the computer 1400.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to proxy a target ECMAScript object regardless whether the target ECMAScript object is a read-only object, the system comprising:

a memory; and one or more processors coupled to the memory, the one or more processors configured to:

receive a request that requests the target ECMAScript object, which includes a plurality of properties, from an ECMAScript engine;

define one or more handler objects, which are configured to perform one or more respective operations on at least one property of the target ECMAScript object;

determine whether the target ECMAScript object includes at least one read-only property, each property of the plurality of properties of the target ECMAScript object is read-only if the property is not capable of being redefined, the each property of the plurality of properties of the target ECMAScript object is not read-only if the property is capable of being redefined;

select a proxying technique from a plurality of proxying techniques to use to proxy the target ECMAScript object based at least in part on whether the target ECMAScript object includes the at least one read-only property, the plurality of proxying techniques including a first proxying technique and a second proxying technique, wherein the target ECMAScript object including the at least one read-only property indicates that the first proxying technique is to be selected from the plurality of proxying techniques, wherein the target ECMAScript object not including the at least one read-only property indicates that the second proxying technique is to be selected from the plurality of proxying techniques; and proxy the target ECMAScript object using the selected proxying technique to generate a proxied target ECMAScript object in response to the request that requests the target ECMAScript object, said proxy the target ECMAScript object comprising:

create a new target ECMAScript object to replace the target ECMAScript object and associate at least the one or more handler objects with the new target ECMAScript object to generate the proxied target ECMAScript object using the first proxying technique based at least in part on the target ECMAScript object including the at least one read-only property; or apply the one or more handler objects to the target ECMAScript object to generate the proxied target ECMAScript object using the second proxying technique based at least in part on the target ECMAScript object not including the at least one read-only property.

2. The system of claim 1, wherein the one or more processors are configured to:

define a plurality of handler objects, which are configured to perform a plurality of respective operations on the at least one property of the target ECMAScript object, the plurality of handler objects including the one or more handler objects; and initiate proxying of the target ECMAScript object using the new target ECMAScript object, which initially has no read-only properties, and add at least a portion of the plurality of handler objects to the new target ECMAScript object to generate the proxied target ECMAScript object using the first proxying technique, based at least in part on the target ECMAScript object including the at least one read-only property.

3. The system of claim 2, wherein the one or more processors are configured to initiate proxying of the target ECMAScript object using the new target ECMAScript object, which initially has no properties, and add the plurality of handler objects to the new target ECMAScript object to generate the proxied target ECMAScript object using the first proxying technique, based at least in part on the target ECMAScript object including the at least one read-only property.

4. The system of claim 2, wherein the one or more processors are configured to create the new target ECMAScript object based on a null prototype.

5. The system of claim 1, wherein the target ECMAScript object is a target function object;

wherein the new target ECMAScript object is a new target function object; and wherein the one or more processors are configured to:

define a plurality of handler objects, which are configured to perform the plurality of respective operations on the at least one property of the target function object, the plurality of handler objects including the one or more handler objects; and initiate proxying of the target function object using the new target function object, which initially has one or more function properties, apply the one or more handler objects to the one or more function properties, and add the plurality of handler objects to the new target function object to generate the proxied target ECMAScript object using the first proxying technique, based at least in part on the target function object including the at least one read-only property.

6. The system of claim 1, wherein the one or more processors are configure to define the one or more handler objects by binding the one or more handler objects to the target ECMAScript object.

7. The system of claim 1, wherein a hierarchical object structure includes a plurality of hierarchical levels, the plurality of hierarchical levels including a top level and one or more sub-levels that are below the top level, wherein the target ECMAScript object is a root of the hierarchical object structure in the top level, wherein each property of an object is represented by a property object in a sub-level immediately below a hierarchical level that includes the object; and wherein the one or more processors are configured to, for each property object;

determine whether the property object includes one or more read-only properties;

select a proxying technique from the plurality of proxying techniques to use to proxy the property object based at least in part on whether the property object includes the one or more read-only properties, the plurality of proxying techniques including the first proxying technique and the second proxying technique, wherein the property object including the one or more read-only properties indicates that the first proxying technique is to be selected from the plurality of proxying techniques, wherein the property object not including the one or more read-only properties indicates that the second proxying technique is to be selected from the plurality of proxying techniques; and proxy the property object using the selected proxying technique to generate a proxied property object, said proxy the property object comprising:

create a new property object to replace the property object and associate at least the one or more handler objects with the new property object to generate the proxied property object using the first proxying technique based at least in part on the property object including the one or more read-only properties; or apply the one or more handler objects to each property of the property object to generate the proxied property object using the second proxying technique based at least in part on the property object not including the one or more read-only properties.

8. The system of claim 1, wherein the one or more processors are configured to wrap the target ECMAScript object by inserting a prepend statement to a beginning of each ECMAScript script and an append statement to an end of the each ECMAScript script to provide a proxied object tree of the target ECMAScript object.

9. The system of claim 1, wherein the one or more processors are configured to determine whether the target ECMAScript object includes the at least one read-only property by determining whether the target ECMAScript object includes an ECMAScript property having an attribute specifying that the ECMAScript property is not configurable, wherein the ECMAScript property having an attribute specifying that the ECMAScript property is not configurable indicates that the ECMAScript property is read-only, wherein the ECMAScript property not having an attribute specifying that the ECMAScript property is not configurable indicates that the ECMAScript property is not read-only.

10. A method of proxying a target ECMAScript object regardless whether the target ECMAScript object is a read-only object, the method comprising:
receiving a request that requests the target ECMAScript object, which includes a plurality of properties, from an ECMAScript engine;
defining one or more handler objects, which are configured to perform one or more respective operations on at least one property of the target ECMAScript object;
determining whether the target ECMAScript object includes at least one read-only property, each property of the plurality of properties of the target ECMAScript object is read-only if the property is not capable of being redefined, the each property of the plurality of properties of the target ECMAScript object is not read-only if the property is capable of being redefined;
selecting a proxying technique from a plurality of proxying techniques to use to proxy the target ECMAScript object based at least in part on whether the target ECMAScript object includes the at least one read-only property, the plurality of proxying techniques including a first proxying technique and a second proxying technique, wherein the target ECMAScript object including the at least one read-only property indicates that the first proxying technique is to be selected from the plurality of proxying techniques, wherein the target ECMAScript object not including the at least one read-only property indicates that the second proxying technique is to be selected from the plurality of proxying techniques; and
proxying the target ECMAScript object using the selected proxying technique to generate a proxied target ECMAScript object in response to the request that requests the target ECMAScript object, said proxying the target ECMAScript object comprising:
creating a new target ECMAScript object to replace the target ECMAScript object and associating at least the one or more handler objects with the new target ECMAScript object to generate the proxied target ECMAScript object using the first proxying technique based at least in part on the target ECMAScript object including the at least one read-only property; or
applying the one or more handler objects to the target ECMAScript object to generate the proxied target ECMAScript object using the second proxying technique based at least in part on the target ECMAScript object not including the at least one read-only property.

11. The method of claim 10, wherein defining the one or more handler objects comprises:
defining a plurality of handler objects, which are configured to perform a plurality of respective operations on the at least one property of the target ECMAScript object, the plurality of handler objects including the one or more handler objects; and
wherein proxying the target ECMAScript object comprises:
initiating proxying of the target ECMAScript object using the new target ECMAScript object, which initially has no read-only properties, and adding at least a portion of the plurality of handler objects to the new target ECMAScript object to generate the proxied target ECMAScript object using the first proxying technique, based at least in part on the target ECMAScript object including the at least one read-only property.

12. The method of claim 11, wherein proxying the target ECMAScript object comprises:
initiating proxying of the target ECMAScript object using the new target ECMAScript object, which initially has no properties, and adding the plurality of handler objects to the new target ECMAScript object to generate the proxied target ECMAScript object using the first proxying technique, based at least in part on the target ECMAScript object including the at least one read-only property.

13. The method of claim 11, wherein proxying the target ECMAScript object comprises:
creating the new target ECMAScript object based on a null prototype.

14. The method of claim 10, wherein the target ECMAScript object is a target function object;
wherein the new target ECMAScript object is a new target function object;
wherein defining the one or more handler objects comprises:
defining a plurality of handler objects, which are configured to perform the plurality of respective operations on the at least one property of the new target function object, the plurality of handler objects including the one or more handler objects; and
wherein proxying the target ECMAScript object comprises:
initiating proxying of the target function object using the new target function object, which initially has one or more function properties, applying the one or more handler objects to the one or more function properties, and adding the plurality of handler objects to the new target function object to generate the proxied target ECMAScript object using the first proxying technique, based at least in part on the target function object including the at least one read-only property.

15. The method of claim 10, wherein defining the one or more handler objects comprises:
binding the one or more handler objects to the target ECMAScript object.

16. The method of claim 10, wherein a hierarchical object structure includes a plurality of hierarchical levels, the plurality of hierarchical levels including atop level and one or more sub-levels that are below the top level, wherein the target ECMAScript object is a root of the hierarchical object structure in the top level, wherein each property of an object is represented by a property object in a sub-level immediately below a hierarchical level that includes the object; and
wherein the method further comprises, for each property object:
determining whether the property object includes one or more read-only properties;
selecting a proxying technique from the plurality of proxying techniques to use to proxy the property object based at least in part on whether the property object includes the one or more read-only properties, the plurality of proxying techniques including the first proxying technique and the second proxying technique, wherein the property object including the one or more read-only properties indicates that the first proxying technique is to be selected from the plurality of proxying techniques, wherein the property object not including the one or more read-only properties indicates that the second proxying technique is to be selected from the plurality of proxying techniques; and proxying the property object using the selected proxying technique to generate a proxied property object, said proxy the property object comprising:
    creating a new property object to replace the property object and associating at least the one or more handler objects with the new property object to generate the proxied property object using the first proxying technique based at least in part on the property object including the one or more read-only properties; or
    applying the one or more handler objects to each property of the property object to generate the proxied property object using the second proxying technique based at least in part on the property object not including the one or more read-only properties.

17. The method of claim 10, comprising:
wrapping the target EMCAScript object by inserting a prepend statement to a beginning of each ECMAScript script and an append statement to an end of the each ECMAScript script to provide a proxied object tree of the target ECMAScript object.

18. The method of claim 10, wherein determining whether the target ECMAScript object includes the at least one read-only property comprises:
determining whether the target ECMAScript object includes an ECMAScript property having an attribute specifying that the ECMAScript property is not configurable, wherein the ECMAScript property having an attribute specifying that the ECMAScript property is not configurable indicates that the ECMAScript property is read-only, wherein the ECMAScript property not having an attribute specifying that the ECMAScript property is not configurable indicates that the ECMAScript property is not read-only.

19. A computer program product comprising a computer-readable storage medium having instructions recorded thereon for enabling a processor-based system to perform operations to proxy a target ECMAScript object regardless whether the target ECMAScript object is a read-only object, the operations comprising:
    define one or more handler objects, which are configured to perform one or more respective operations on at least one property of the target ECMAScript object, wherein the target ECMAScript object includes a plurality of properties;
    determine whether the target ECMAScript object includes at least one read-only property based at least in part on receipt of a request that requests the target ECMAScript object from an ECMAScript engine, each property of the plurality of properties of the target ECMAScript object is read-only if the property is not capable of being redefined, the each property of the plurality of properties of the target ECMAScript object is not read-only if the property is capable of being redefined;
    select a proxying technique from a plurality of proxying techniques to use to proxy the target ECMAScript object based at least in part on whether the target ECMAScript object includes the at least one read-only property, the plurality of proxying techniques including a first proxying technique and a second proxying technique, wherein the target ECMAScript object including the at least one read-only property indicates that the first proxying technique is to be selected from the plurality of proxying techniques, wherein the target ECMAScript object not including the at least one read-only property indicates that the second proxying technique is to be selected from the plurality of proxying techniques; and
    proxy the target ECMAScript object using the selected proxying technique to generate a proxied target ECMAScript object in response to the request that requests the target ECMAScript object, said proxy the target ECMAScript object comprising:
        create a new target ECMAScript object to replace the target ECMAScript object and associate at least the one or more handler objects with the new target ECMAScript object to generate the proxied target ECMAScript object using the first proxying technique based at least in part on the target ECMAScript object including the at least one read-only property; or
        apply the one or more handler objects to the target ECMAScript object to generate the proxied target ECMAScript object using the second proxying technique based at least in part on the target ECMAScript object not including the at least one read-only property.

20. The computer program product of claim 19, wherein the operations comprise:
    define a plurality of handler objects, which are configured to perform the plurality of respective operations on the at least one property of the target ECMAScript object, the plurality of handler objects including the one or more handler objects; and
    initiate proxying of the target ECMAScript object using the new target ECMAScript object, which initially has no read-only properties, and add at least a portion of the plurality of handler objects to the new target ECMAScript object to generate the proxied target ECMAScript object using the first proxying technique, based at least in part on the target ECMAScript object including the at least one read-only property.

21. A system comprising:
a memory; and
one or more processors coupled to the memory, the one or more processors configured to:
    determine whether a requested target ECMAScript object includes at least one read-only property, each property of the requested target ECMAScript object is read-only if the property is not capable of being redefined, the each property of the requested target ECMAScript object is not read-only if the property is capable of being redefined;
    proxy the requested target ECMAScript object to generate a proxied target ECMAScript object based at least in part on a determination that the requested target ECMAScript object includes the at least one read-only property by performing operations comprising:
        create a new target ECMAScript object to replace the requested target ECMAScript object; and
        associate the plurality of handler objects, which are configured to perform a plurality of respective operations on at least one property of the requested target ECMAScript object, with the new target ECMAScript object to generate the proxied target ECMAScript object.

22. The system of claim 21, wherein the one or more processors are configured to proxy the requested target ECMAScript object based at least in part on the determination that the requested target ECMAScript object includes the at least one read-only property by performing the operations comprising:

create the new target ECMAScript object to initially have no read-only properties; and add at least a portion of the plurality of handler objects to the new target ECMAScript object to generate the proxied target ECMAScript object.

23. The system of claim 21, wherein the requested target ECMAScript object is a target function object;

wherein the new target ECMAScript object is a new target function object; and wherein the one or more processors are configured to proxy the requested target ECMAScript object based at least in part on the determination that the requested target ECMAScript object includes the at least one read-only property by performing the operations comprising:

create the new target function object to initially have one or more function properties;

apply one or more handler objects of the plurality of handler objects to the one or more function properties; and add the plurality of handler objects to the new target function object to generate the proxied target ECMAScript object.

* * * * *